E. E. WINKLEY.
HEEL BUILDING MACHINE.
APPLICATION FILED AUG. 26, 1910. RENEWED JULY 6, 1917.

1,286,472.

Patented Dec. 3, 1918.
9 SHEETS—SHEET 1.

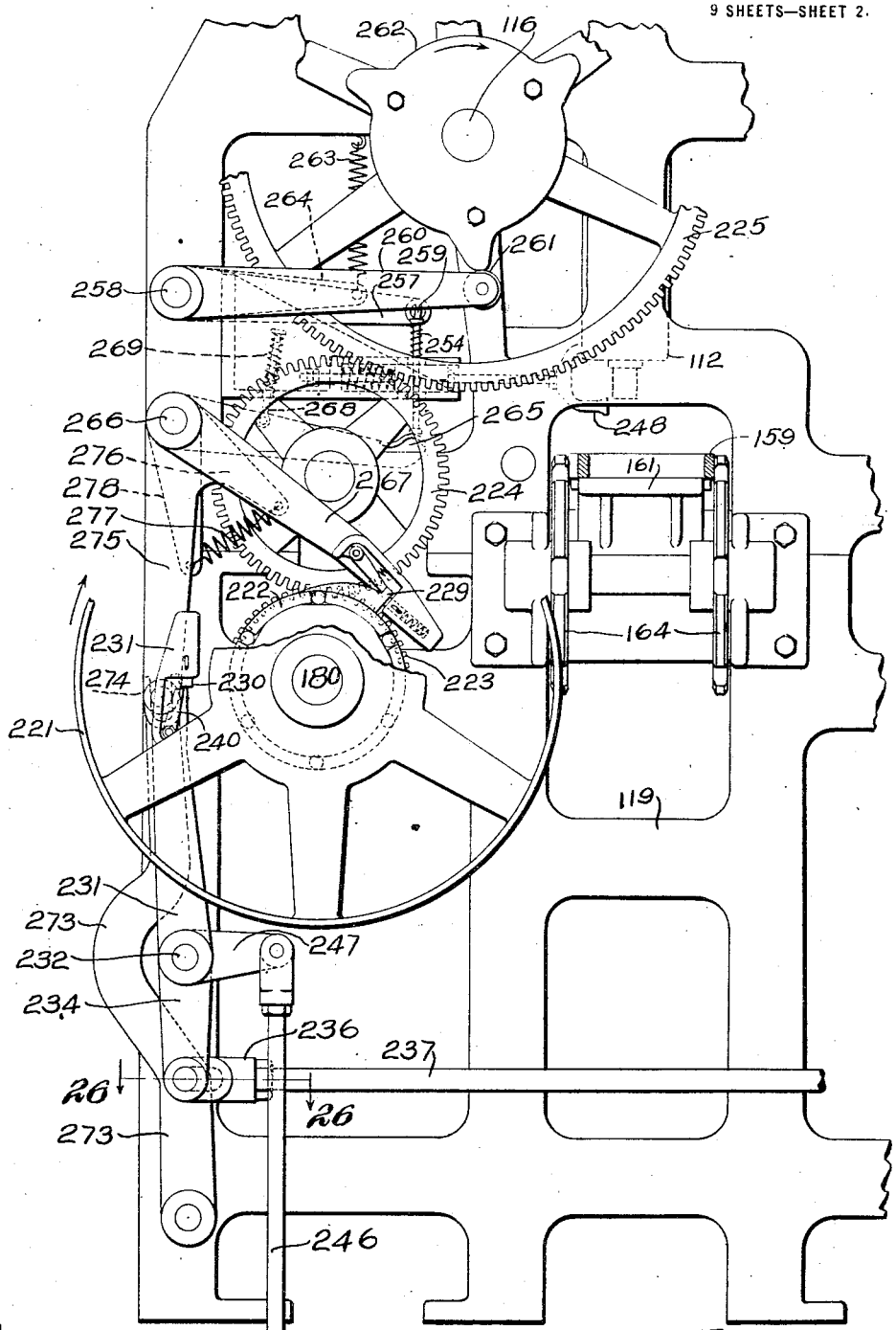

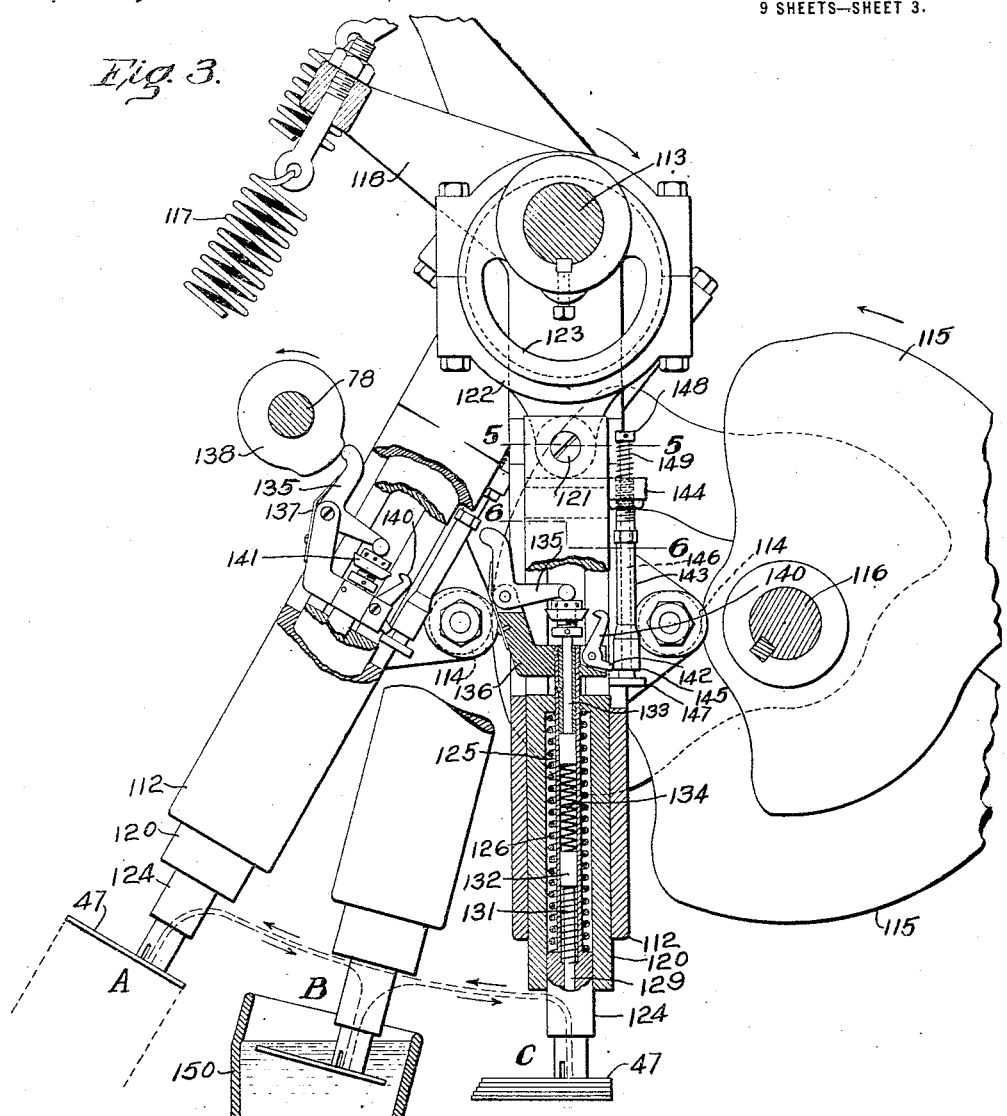

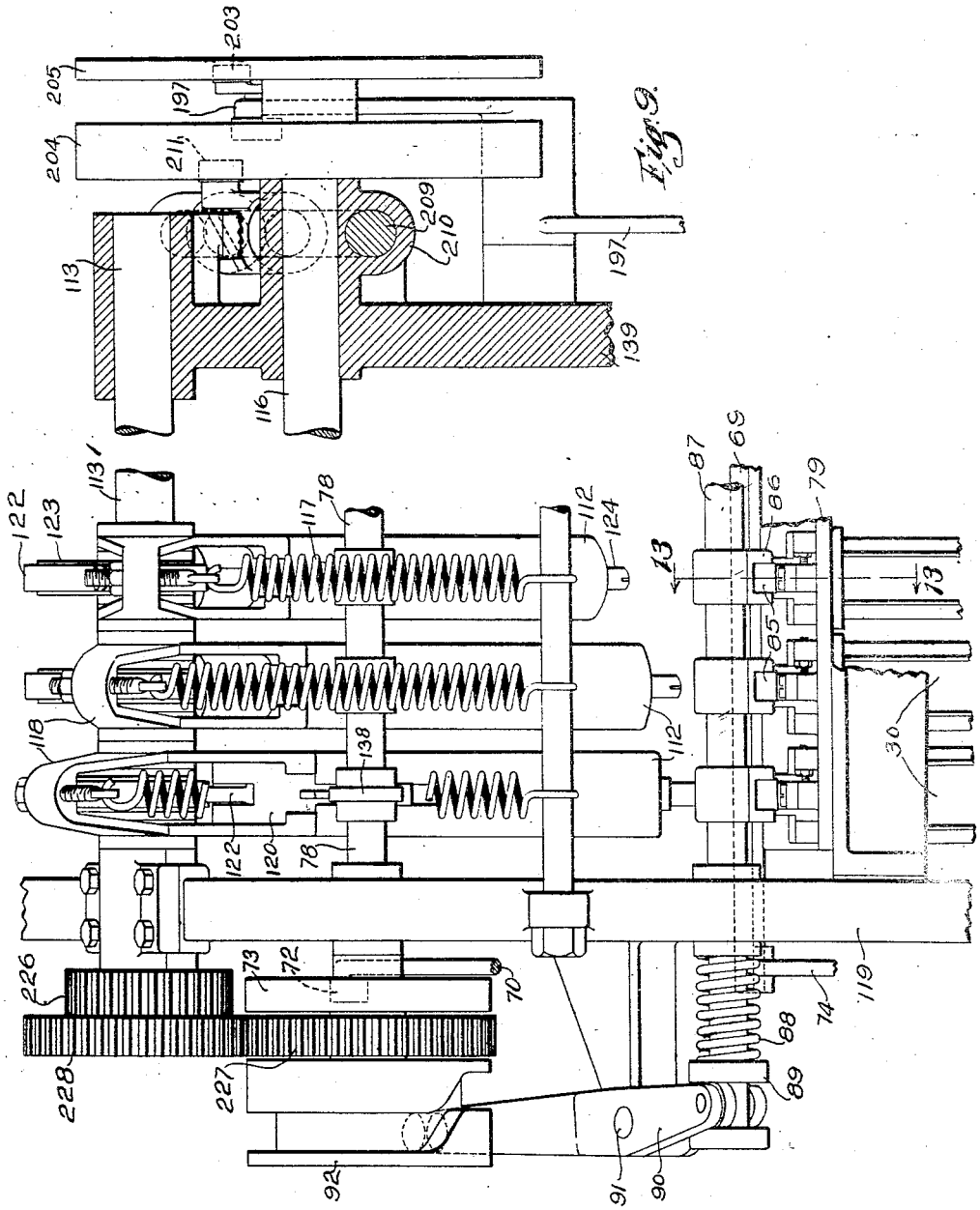

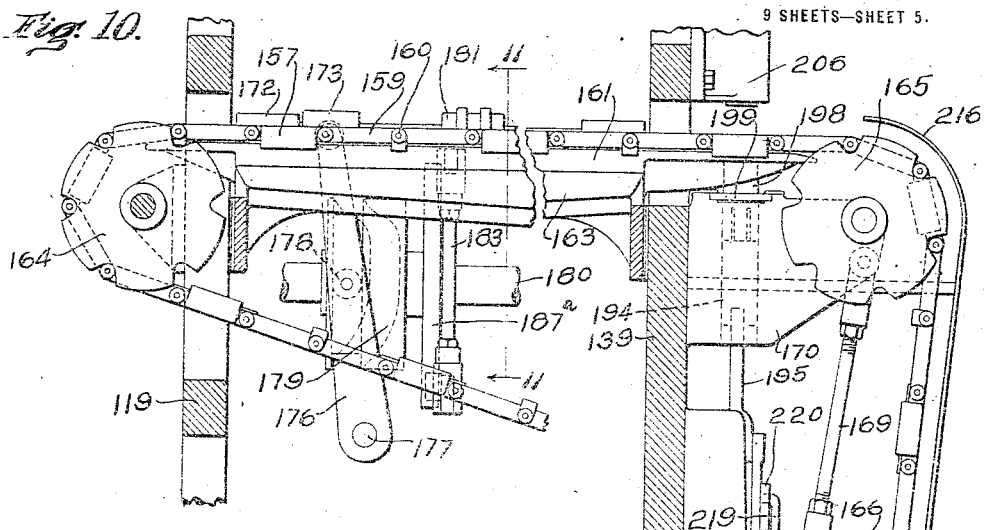
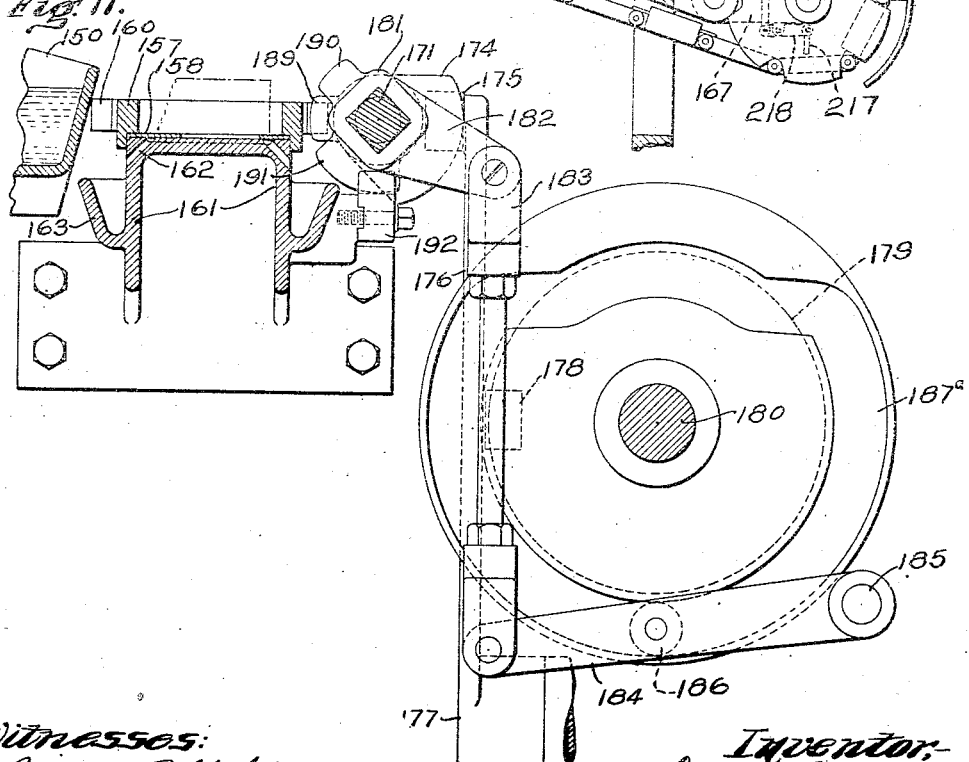

E. E. WINKLEY.
HEEL BUILDING MACHINE.
APPLICATION FILED AUG. 26, 1910. RENEWED JULY 6, 1917.
1,286,472.
Patented Dec. 3, 1918.
9 SHEETS—SHEET 6.
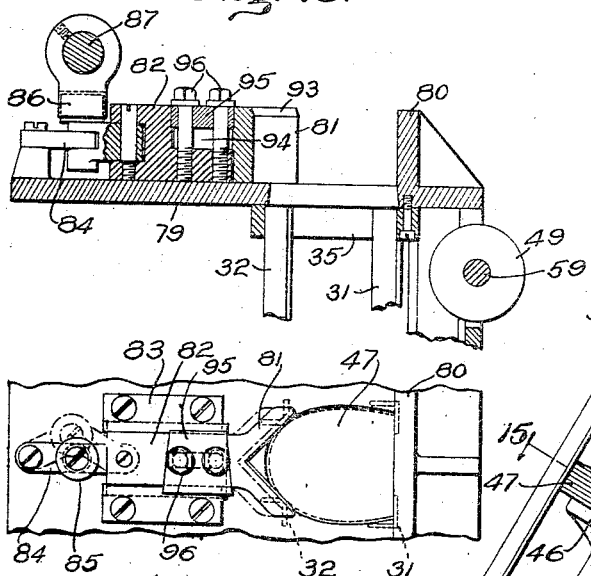
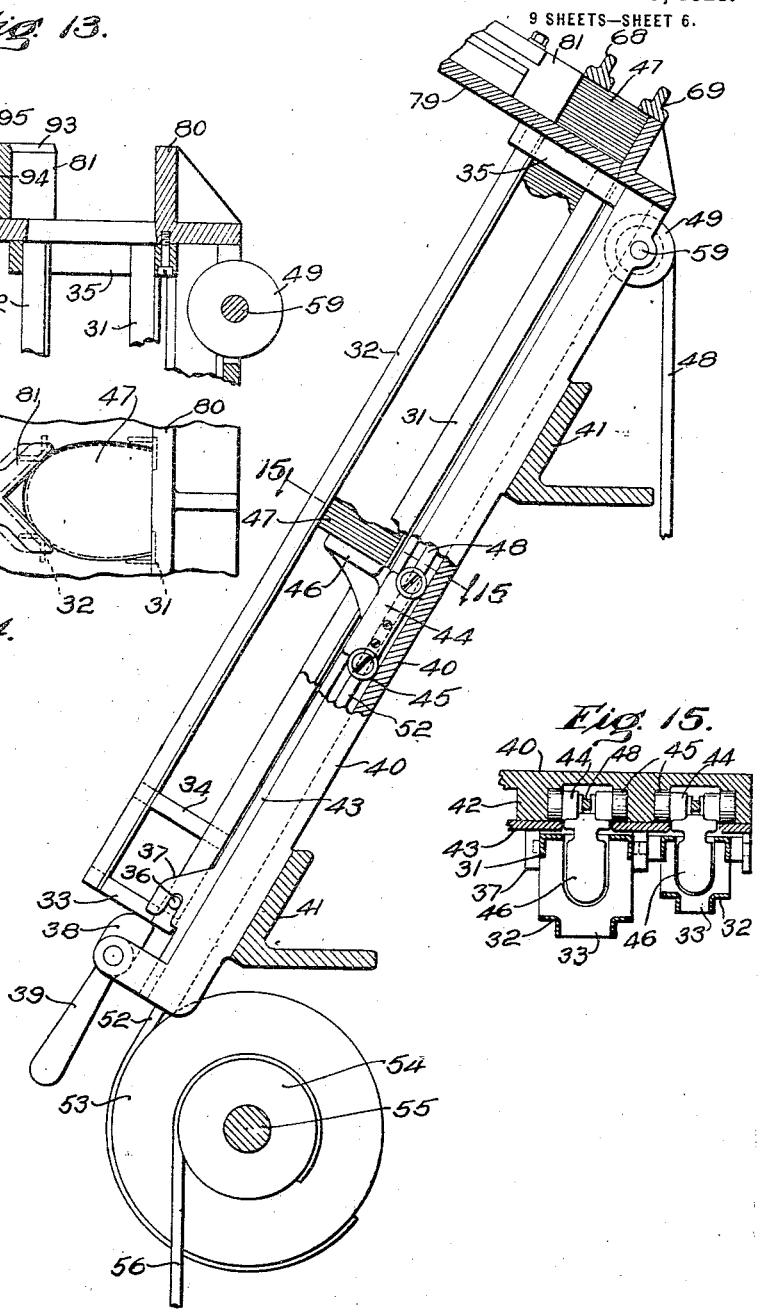

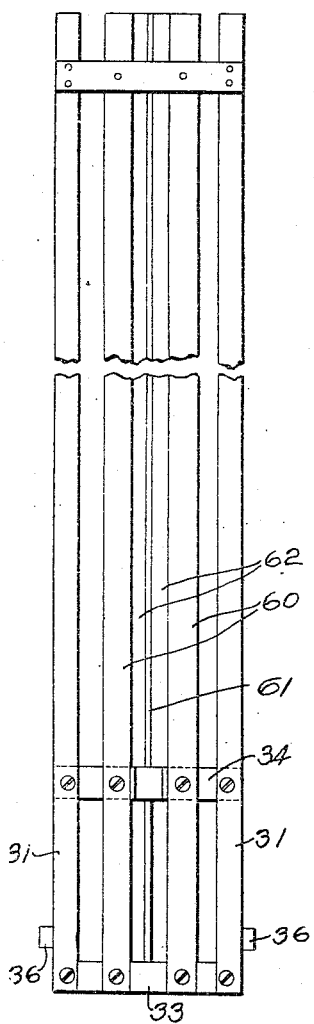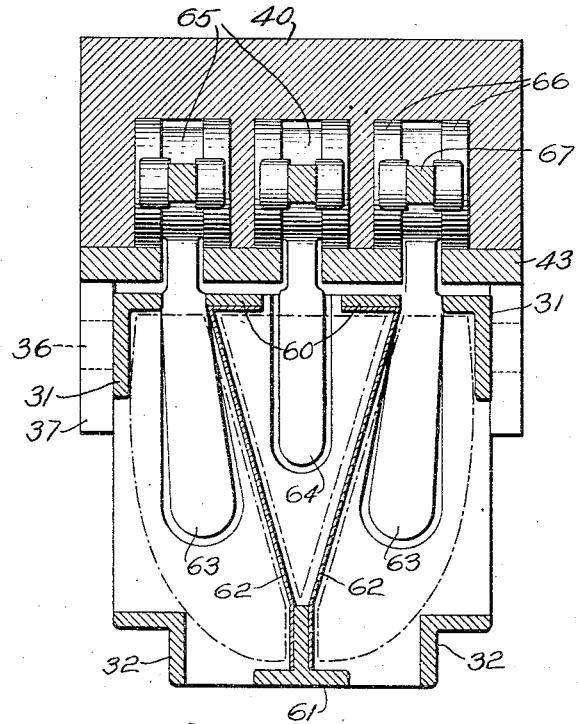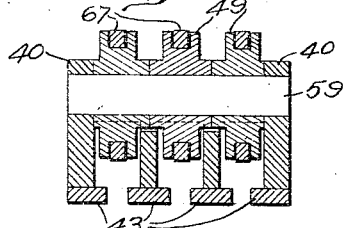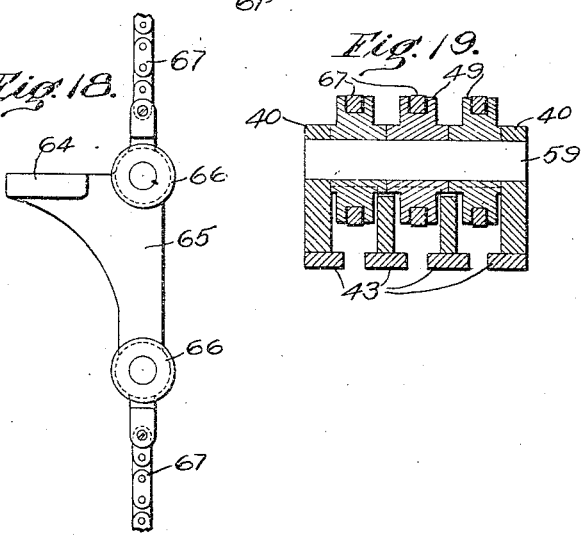

E. E. WINKLEY.
HEEL BUILDING MACHINE.
APPLICATION FILED AUG. 26, 1910. RENEWED JULY 6, 1917.
1,286,472.
Patented Dec. 3, 1918.
9 SHEETS—SHEET 8.
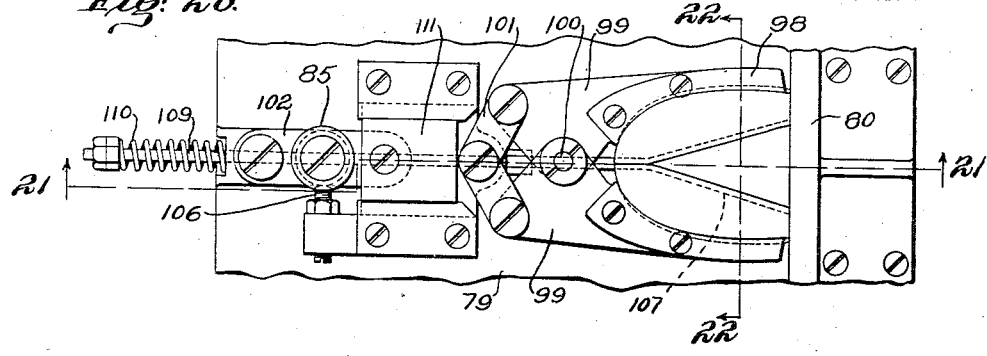
Fig. 20.
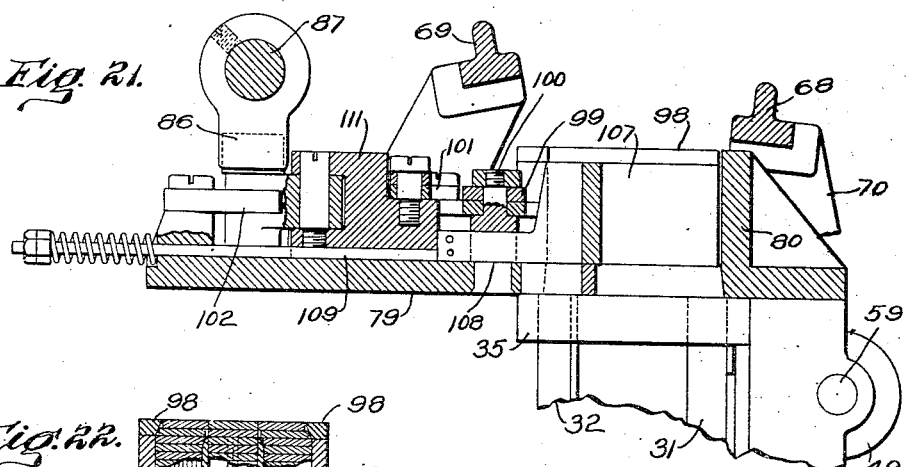
Fig. 21.
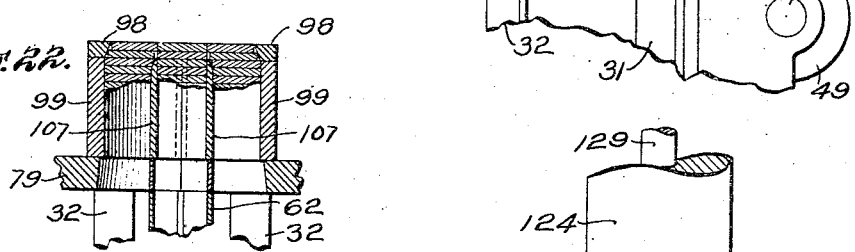
Fig. 22.
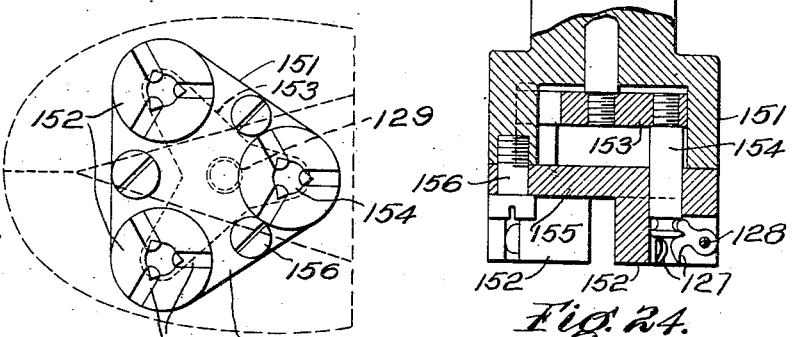
Fig. 23.
Fig. 24.
Witnesses:
Roswell F. Hatch
Warren G. Ogden
Inventor:
Erastus E. Winkley
by his Attorneys
Phillips Van Everen & Fish E. E. WINKLEY.
HEEL BUILDING MACHINE.
APPLICATION FILED AUG. 26, 1910. RENEWED JULY 6, 1917.
1,286,472.
Patented Dec. 3, 1918.
9 SHEETS—SHEET 9.
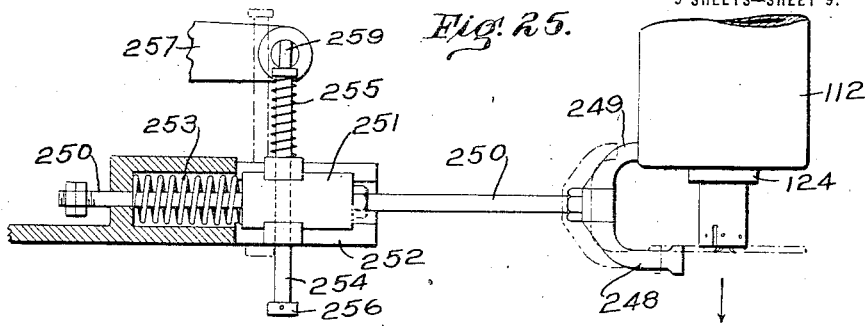
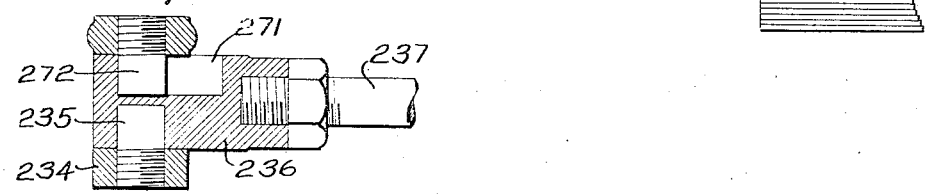
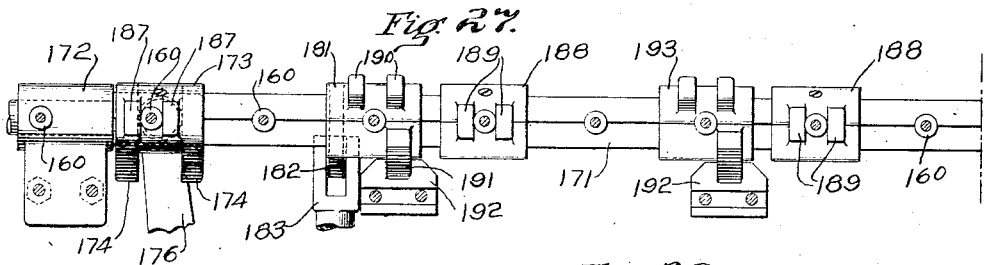
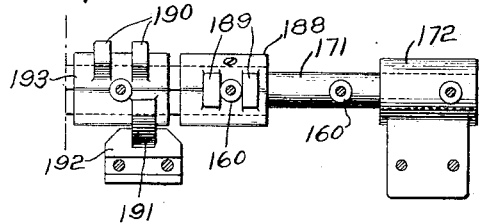
Witnesses:
Roswell F. Hatch
Warren G. Ogden
Inventor:
Erastus E. Winkley
by his Attorneys
Phillips Van Everen & Fish

UNITED STATES PATENT OFFICE.

ERASTUS E. WINKLEY, OF LYNN, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

HEEL-BUILDING MACHINE.

1,286,472. Specification of Letters Patent. Patented Dec. 3, 1918.

Application filed August 26, 1910, Serial No. 579,109. Renewed July 6, 1917. Serial No. 179,096.

*To all whom it may concern:*

Be it known that I, ERASTUS E. WINKLEY, a citizen of the United States, residing at Lynn, in the county of Essex and State of Massachusetts, have invented certain new and useful Improvements in Heel-Building Machines; and I do hereby declare the following to be a full, clear, and exact description of the invention, such as will enable others skilled in the art to which it appertains to make and use the same.

This invention relates to automatic shoe machines and more particularly to machines by which the lifts, of pieces of leather or other material, which constitute a heel are assembled and fastened together.

One object of the present invention is to produce a machine in which heel lifts may be automatically assembled with rapidity and precision. Another object of this invention is to produce a machine of this character in which lifts of different sizes may be assembled in such a manner as to form a heel of predetermined contour or form, thereby employing the material more economically than where a heel is built up of lifts all of the same size and is thereafter brought to the required form by a shaping operation. A third object of the invention is to produce a machine of the kind above referred to, which shall have novel and improved means for transferring the lifts from the hoppers or other containers in which they are held to a support upon which the lifts may be assembled, and for applying paste to these lifts, prior to their assembly, to secure them together when assembled. A fourth object of the invention is to produce a machine particularly adapted to build heels of pieced lifts, the machine being arranged to handle the component pieces of the lifts in their assembled position, and being arranged also to apply paste to the contiguous edges of the pieces as well as to their lateral surfaces, so that the pieces are securely pasted together throughout the heel. A fifth object of the invention is to provide a holder for containing lifts, or the like, in regular order, in combination with a novel transferring mechanism for seizing the articles in the holder, whether they are whole or pieced lifts, and retaining control of them during their transfer, and means for presenting the articles in the holder within the range of movement of the transferring mechanism. A sixth object of the invention is to provide improved means for securing together the pasted lifts composing a heel comprising means for subjecting each lift, when applied to those already assembled, to a substantial pressure, whereby to squeeze the paste into a thin film and expel the air between the lifts, which provides a materially increased tenacity in the paste.

In accordance with these objects, the various features of the invention contemplate the provision in an automatic heel building machine of the constructions and combinations of elements hereinafter specifically described. It will be obvious, however, from the following description that some features of the invention are useful in automatic machines for performing various operations involving the handling of heel lifts and the like, therefore, while for ease of explanation, the following description has been confined to the coöperative action of the various features of the invention in performing a heel building operation, these features will be found to be definitely stated in their true scope in the claims herewith.

To the accomplishment of the objects above referred to and such others as may hereinafter appear, as will be readily understood by those skilled in the art, the invention comprises the features and combinations of parts hereinafter described and particularly pointed out in the appended claims.

In the accompanying drawings illustrating the preferred form of the invention, Figure 1 is a right-side elevation of a heel-building machine in which the features of the present invention have been embodied:

Fig. 2 is a partial left-side elevation of a portion of the machine of Fig. 1, on a larger scale and with parts broken away to show interior construction;

Fig. 3 is a side-elevation, partly in section, of the picker mechanism;

Fig. 4 is an end-view, from beneath, of one of the pickers;

Fig. 5 is a horizontal section on the line 5—5 in Fig. 3, of one of the pickers;

Fig. 6 is a horizontal section on the broken line 6—6 in Fig. 3;

Fig. 7 is a vertical section on the broken line 7—7 in Fig. 4;

Fig. 8 is an oblique view, showing particularly the picker mechanism, looking in the direction of the arrow 8 in Fig. 1;

Fig. 9 is a section on the inclined line 9—9 in Fig. 1, showing certain details of the mechanism at the rear of the machine;

Fig. 10 is a vertical section, showing in detail the conveyer-chain, on the line 10—10 in Fig. 1;

Fig. 11 is a vertical section on the line 11—11 in Fig. 10;

Fig. 12 is a side-elevation, partly in section, showing in detail one of the heel-lift hoppers and the associated parts;

Fig. 13 is a vertical section, on the line 13—13 in Fig. 8, looking from right to left in said figure, and showing particularly the delivering mechanism at the upper end of the hopper, the parts being turned, in the section plane, to vertical and horizontal positions;

Fig. 14 is a plan-view of the parts shown in Fig. 13;

Fig. 15 is a section on the line 15—15 in Fig. 12;

Fig. 16 is a detail view of a hopper adapted for use in connection with pieced lifts, the hopper being shown detached from the machine, and from its rear side;

Fig. 17 is a right section, on a greatly enlarged scale, of the hopper of Fig. 16, together with the follower-mechanism associated therewith;

Fig. 18 is a side-elevation of one of the followers employed in connection with the hopper of Fig. 16;

Fig. 19 is a right-section showing parts of the follower-mechanism for said hopper;

Fig. 20 is a detail-view, looking downward and in the direction of the length of the hopper, showing the delivering mechanism of the hopper of Fig. 16;

Fig. 21 is a vertical section on the line 21—21 of Fig. 20 with coöperating parts above the plane of Fig. 20;

Fig. 22 is a section on the line 22—22 of Fig. 20;

Fig. 23 is an end-view from beneath of a form of picker adapted for use with the hopper of Fig. 16;

Fig. 24 is a side-elevation, partly in section, of the lower extremity of the picker of Fig. 23;

Fig. 25 is a side-elevation, partly in section, of the feeler-mechanism by which the automatic stop is controlled;

Fig. 26 is a section, on the line 26—26 of Fig. 2, showing a portion of the stop-mechanism; and Figs. 27 and 28, taken together, constitute a side-elevation of a portion of the driving and locking mechanism for operating the conveyer-chain.

Figure 1:
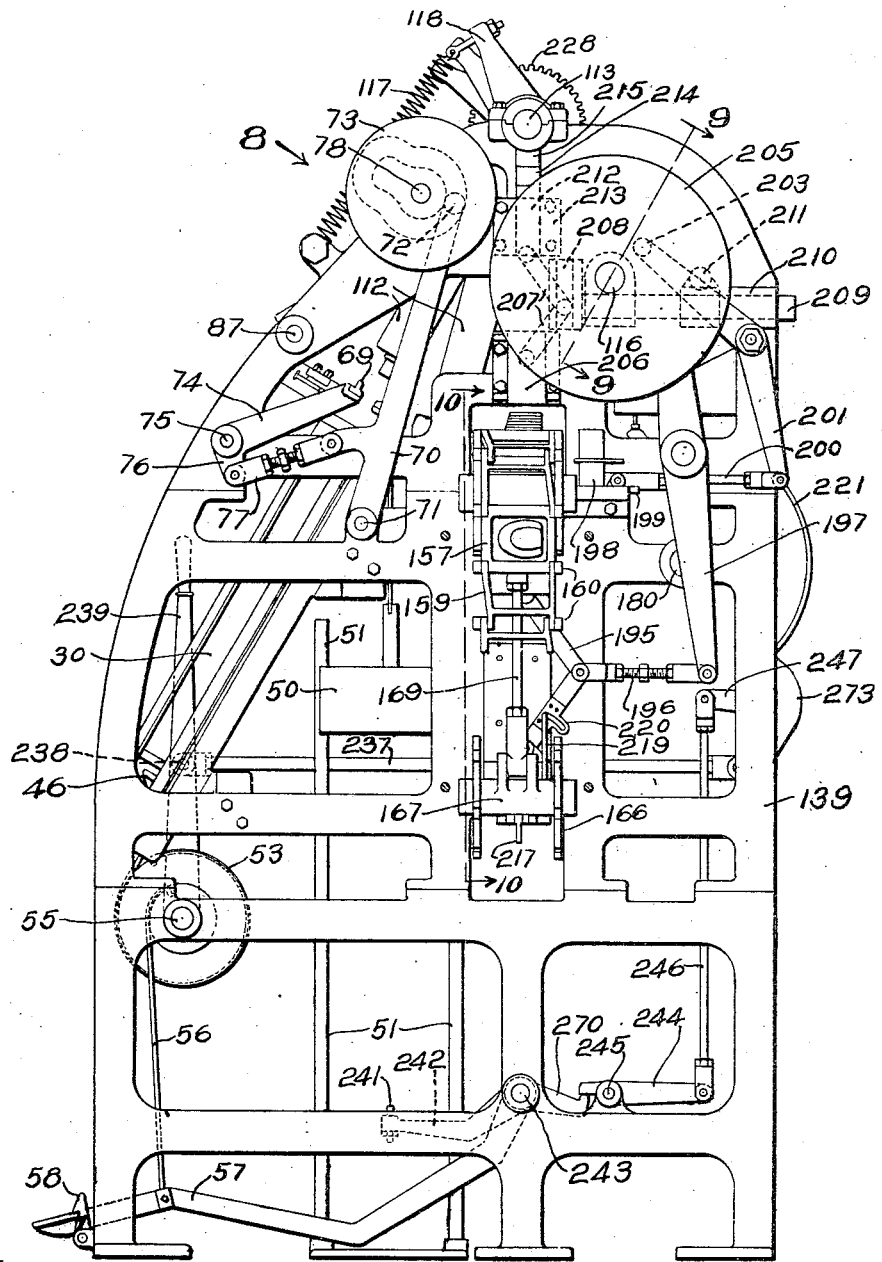

In the illustrated embodiment of the invention the lifts of several sizes, of which the heels are to be composed, are graded in stacks contained respectively in a series of suitable containers hereinafter termed hoppers. From each of these hoppers the lifts are removed, one by one, by devices hereinafter designated as "pickers," and each lift so removed by a picker is first dipped into a receptacle containing paste, and is then deposited upon a heel-support in the form of a conveyer-chain, the chain being moved along, step-by-step, from the operative position of one picker to that of the next, so that the lifts are laid one upon another in a pile of the required thickness. The pile of lifts so formed is then carried by the chain to a position where it may be acted upon by pressing and nailing devices.

The hoppers are generally indicated in Fig. 1 by the reference character 30 and are shown in this figure after the stack of lifts has been used and the hopper is about to be replaced or refilled. As the machine is adapted for use in building heels either of whole lifts or of pieced lifts, either of two forms of hoppers and of pickers may be employed. For whole lifts there is provided the form of hopper illustrated particularly in Figs. 12 to 15. This hopper comprises inner angle-bars 31 and outer angle-bars 32, which are held together, near their lower ends, by frames 33 and 34, and between these bars the lifts 47 are placed in a stack. The hopper is removable, for convenience in filling it, or for changing from one size or form of hopper to another, and to this end it is provided, near its lower end, with lateral pins 36 which engage fixed hooks 37. The hopper is held in operative position by a cam-shaped portion 38 of a hand-lever 39, which is pivoted upon lugs extending from a plate 40. The plate 40 constitutes a base for the hopper, and is permanently fixed upon cross-bars 41 constituting parts of the frame of the machine. The upper ends of the bars 31 and 32 are held in place by a frame 35, which is fixed to a plate 79 constituting a fixed portion or frame member of the machine. When the hopper is to be removed, for the purposes above described, the hand-lever 39 is swung forward, thereby releasing the hopper and permitting the pins 36 to be disengaged from the hooks 37 and the upper ends of the bars to be drawn from the frame 35.

As shown in Fig. 15, the base-plate 40 is provided with grooves and with intermediate projecting portions 42, and upon the latter are mounted plates 43 overhanging the grooves so as to form guideways for carriages 44 provided with rollers 45. Each carriage is provided with a follower 46 which projects into the space between the bars of the hopper so as to engage the bottom of the stack of heel-lifts therein. Each carriage is supported by a flexible member 48, which may be a cord or chain, and this member passes over a pulley 49 pivoted at 59 near the upper end of the base-plate 40. The cord or chain 48 is secured to a weight 50 (Fig. 1) which slides vertically between guide-rods 51. Owing to this arrangement the follower is constantly pressed upward against the heel-lifts, with a force sufficient to raise or feed the latter, within the hopper, as fast as they are removed from the upper end of the hopper.

After the hopper has been completely emptied the follower is drawn down again by means of a cord or chain 52 which is connected with the carriage and passes around a drum 53. A second drum 54, of smaller diameter, is fixed to the drum 53, and the drums are journaled upon a horizontal rod 55 secured in the frame of the machine. From the drum 54 a cord or chain 56 passes downward to a treadle 57 (Fig. 1) pivoted on the frame of the machine. After the treadle has been depressed so as to depress the follower and raise the weight 50 by the operation of the drums, it is engaged and held by a latch 58 while the hopper is removed, refilled and replaced.

The form of hopper and of follower-mechanism employed in connection with pieced lifts is shown particularly in Figs. 16 to 19. These devices are used, in the illustrated machine, with lifts consisting of a triangular central piece and two lateral pieces curved to form the periphery of the lift. These pieces are shown in broken lines in Fig. 17. In addition to the bars 31 and 32, the hopper is provided with two bars 60 at its rear side, and a third outer bar 61. The bars 60 are connected with the bar 61 by plates 62, the hopper being thus divided into three longitudinal parts adapted to receive the three stacks of the pieces which go to make up a lift. As these several pieces may vary in thickness to some extent, a separate follower is used for each stack, the outer stacks having followers 63 and the central stack, of triangular pieces, having a follower 64 somewhat shorter than the followers 63. These followers are all actuated in substantially the same manner as the followers of the form of hopper first described, being each mounted upon a carriage 65 provided with rollers 66 and actuated by chains 67. In this case, however, a separate weight is employed in connection with each chain, so that there are three weights instead of one for each hopper. As shown in Fig. 19, there are also separate pulleys for the three chains, these pulleys being all journaled upon the common axis 59.

To deliver the whole lifts one by one from the upper end of the hopper, there is employed a delivering mechanism which is illustrated particularly in Figs. 1, 8, 12, 13 and 14. The stack of lifts is normally retained within the hopper by means of an abutment comprising two retainer-bars 68 and 69, which extend from side to side of the machine across the tops of all the hoppers. At each extremity the retainer-bar 69 is mounted upon an arm 74 fixed to a rock-shaft 75 journaled in the frame of the machine. The rock-shaft has a depending arm 76 which is connected, by an adjustable link 77, with an arm 70 fixed to a rock-shaft 71 journaled on the frame of the machine at one side of the machine (Fig. 1). The arm 70 is extended upward and carries, at its upper end, a cam-roll 72 engaging a cam 73 on one end of a cam-shaft 78 journaled in the frame of the machine. The retainer-bar 68 is mounted, at its ends, directly upon the arms 70. The construction just described is such that, through the action of the cam, the two retainer-bars, at appropriate times in the operation of the machine, are moved apart, and away from the upper ends of the hoppers, so as to disengage and release the uppermost lifts of the stacks.

As only one lift is to be removed from a stack at a time, it is necessary to provide means for retaining in the hoppers all but the uppermost lift when the retainer-bars have been moved away as above described. For this purpose the lifts at the upper end of the stack are temporarily clamped between a fixed clamp-plate 80 and a movable clamp-jaw 81 (Figs. 12, 13 and 14). The plate 80 is formed integral with the frame-plate 79, while the jaw 81 slides upon the frame-plate toward and from the clamp-plate. These clamp-members constitute an upward extension of the hopper and normally permit the heel-lifts to pass freely up between them. Just before the retainer-bars are disengaged from the uppermost lift, however, the jaw is moved toward the plate by means of a mechanism comprising a toggle 84 which is provided, at its central joint, with a roll 85 by which it is actuated. This roll is engaged on opposite sides by lugs 86 depending from a slide-rod 87. As shown in Fig. 8, the slide-rod controls all of the clamp-mechanisms and is actuated by a lever 90 pivoted at 91 to a bracket fixed to the frame of the machine. One end of the lever is engaged between two collars 89 on the slide-rod and the other end is actuated by a cam 92 to give the slide-rod a reciprocating motion at the proper times to clamp and release the lifts. A spring 88 is provided between the collar 89 and the machine frame to aid the cam in releasing the lifts.

The toggle 84 is connected with a slide 82 which slides within guides 83 upon the frame-plate 79. The clamp-jaw 81 is connected with this slide so as to be actuated thereby. These connections comprise a stem 94 upon the clamp-jaw, which is longitudinally slotted and is traversed by two screws 96 threaded into the slide 82. Above the stem 94 is a slightly wedge-shaped plate 95 which has transversely elongated openings traversed by the screws 96. The inclined edges of this plate engage, respectively, a shoulder on the slide and a shoulder on the clamp-jaw, so that those parts may be relatively adjusted by loosening the screws and moving the plate 95 transversely, thus adapting the mechanism to lifts of different sizes.

In order that the mechanism just described may act to retain all except the uppermost lift but leave the latter free, the upper inner edge of the clamp-jaw is beveled at 93, as shown in Figs. 13 and 14, so that it does not forcibly engage and clamp the uppermost lift.

In addition to the clamping function just described, it will be apparent that the clamp-jaw and the plate 80 act also as a gaging device by which all of the heel-lifts are brought with their breast-edges in a definite position in the machine before they are acted upon, as hereinbefore described, by the pickers.

In connection with the hopper for pieced lifts, a somewhat different form of clamp-mechanism is employed, this mechanism being illustrated particularly in Figs. 20, 21 and 22. Here the clamp-plate 80 coöperates with two clamp-jaws 98 which are mounted upon levers 99 having a common pivot 100 rising from the frame-plate 79. The outer ends of the levers 99 are connected by a toggle 101, which is pivoted to a slide 111 moving in guides on the frame-plate. The slide, in turn, is actuated by a second toggle 102, substantially similar in its operation to the toggle 84 hereinbefore described. To limit the movement of this toggle to its straight-line position, an adjustable stop-screw 106 is provided, as shown in Fig. 20, to engage one of the toggles. When the toggle 102 is straightened by the action of the slide-rod the toggle 101 throws the levers 99 and the clamp-jaws 98 toward each other, thereby clamping the outer pieces of the lift against each other and against the plate 80.

To clamp the triangular pieces of the lift at the same time, a clamp-member 107 is provided, this member having two diverging portions united in a stem 108. The diverging portions are arranged directly above the partition-plates 62 in the hopper, but they terminate (as shown in Fig. 22) below the upper edges of the clamp-jaws, so that before the pieces constituting a complete lift are removed from the stack, they are brought close together, as shown. The stem 108 passes through a slot in the stud 100 on which the levers 99 are pivoted, so that it may be engaged by the end of the slide 111. When the slide moves forward to operate the toggle 101, it also acts, by engagement with the stem, to force the clamp-member 107 forward, and this member acts to clamp the triangular pieces against the plate 80. A rod 109 is fixed to the stem 108 and is controlled by a compression-spring 110, which acts to withdraw the clamp-member 107 when the slide 111 is retracted.

The hoppers are mounted, as shown in the drawings, in oblique position, and the lifts are placed in the hoppers with their breast-edges against the lower sides of the hoppers. For this reason the uppermost lift in each stack, although released from the action of the clamp-mechanism, remains with its breast-edge in contact with the clamp-plate 80 until it is seized by the picker.

It will be obvious that pieced lifts with component pieces of other forms than those illustrated may be employed, the modifications in the hoppers to adapt them to receive such modified lifts being matters of design and requiring no substantial alteration in the mechanical devices by which the pieces are fed and delivered. It will also be understood that where pieced lifts are employed, the successive lifts of the heel will not be composed of pieces of the same form, but, in order to "break joints" in the contiguous lifts, a lift having pieces like those illustrated, for example, will be alternated either with whole lifts or with lifts having pieces of other forms, hoppers of the required form being arranged upon the machine in suitable sequence to produce this result.

The pickers hereinbefore referred to, which constitute the devices for transferring the heel-lifts from the stacks to the work-support, are illustrated particularly in Figs. 3 to 8 and Figs. 23 and 24. Each picker comprises an arm 112 which is loosely pivoted upon a shaft 113 journaled at the top of the machine. In order to swing the picker-arms about the shaft 113, each arm is provided with a lug upon which is journaled a cam-roll 114, and each cam-roll engages one of a series of similar cams 115. The cams are fixed upon and rotated by a cam-shaft 116, journaled in the frame of the machine, and are arranged in different angular positions on the shaft, uniformly spaced so as to cause the pickers to operate in succession and at equal intervals of time. Each picker-arm is integral with an arm 118 to which one end of a tension spring 117 is connected, and the springs act to maintain the cam-rolls in engagement with the cams.

Each picker-arm carries a slide 120, which is pivotally connected by a pin 121, near its upper end, (Fig. 3), with an eccentric-strap 122, which embraces an eccentric 123 fixed to the shaft 113 upon which the picker-arms are journaled. This shaft rotates constantly at three times the speed of the shaft 116. Its rotation has no effect upon the swinging movements of the picker-arms, but the eccentric-mechanism just described operate to lower and raise the slides 120 in the picker-arms, and by the combination of this movement and of the swinging movements imparted to the arms by the picker-cams the pickers are caused to follow the required paths of movement which are approximately indicated by the broken lines on Fig. 3.

Each picker-slide 120 carries a stem having an enlarged lower end 124 which slides freely in the lower end of the picker-slide. The upper portion 125 of the stem is reduced in diameter and slides through a hole in the upper end of the picker-slide. The stem is normally held in its lowermost position by means of a compression-spring 126 surrounding the portion 125 and inclosed within the picker-slide, the lower end of this spring engaging the enlarged portion 124 of the stem. When the slide is advanced, however, by means of the eccentric mechanism above described, and the extremity of the picker engages a heel-lift, the spring 126 yields and permits the stems to slide upwardly within the picker-slide.

To seize the heel-lift, the picker is provided with three or more curved claws 127 mounted in radial slots in the lower extremity of the stem. These claws are mounted on pivots 128 and are of such form that they may be either withdrawn entirely within the slots or swung downwardly upon the pivots in such a manner that their sharp points move downwardly and outwardly into the lift, in the position shown in Fig. 7. In order that the prongs may tend to draw the lift closely against the bottom of the picker as the prongs are forced into the lift the outer curved side of each prong is substantially concentric with the axis of the prong and the inner curved side of each prong is eccentric to the axis thereof so that the acting face of the prong tapers or decreases vertically in thickness progressively toward its point. This operation of the claws is produced by means of a plunger 129, which has an annular groove at its lower end engaging lugs 130 on the claws. The plunger slides longitudinally in the stem 124 and is provided with an enlarged upper extremity 132. Beneath this enlarged extremity is a compression-spring 131 which normally holds the plunger in raised position so that the claws are retracted within the stem. The plunger 129 is actuated by means of a second plunger 133, a compression-spring 134 of greater strength than the spring 131 being interposed between the two plungers to permit the necessary yielding of the lower plunger when the claws have fully seated themselves in the lift. The plunger 133 slides within the reduced portion 125 of the stem 124, and it is actuated by means of a cam-lever 135 which engages the upper extremity of the plunger. This cam-lever is of bell-crank form, and is pivoted upon a bracket 136 fixed to the upper end of the stem. A spring 137 fixed to the bracket engages the cam-lever and maintains it constantly in engagement with the plunger 133.

The cams 138 by which the cam-levers 135 are actuated, are all mounted upon the cam-shaft 78 hereinbefore mentioned. When one of the picker-arms is swung to the position designated by the reference letter A in Fig. 3, the corresponding cam-lever 135 engages one of the cams, and a raised portion on the cam then swings the lever in such a direction as to cause it to depress the plungers 133 and 129, thereby forcing the claws downwardly and outwardly into the lift. This action occurs after the eccentric-mechanism has brought the end of the picker-stem firmly into engagement with the upper surface of the uppermost lift in the corresponding stack. In Fig. 3 the parts are shown in the position just described, but only the uppermost lift of the stack is illustrated.

As the claws must be retained in holding position while the picker-arm is swung inwardly and until the lift has been properly deposited upon the work-support, and as these movements of the picker-arm withdraw the cam-lever 135 from engagement with its cam, independent means are provided for holding the plunger 133 in depressed position until the proper time for releasing the lift. To this end a latch 140 is pivoted upon the bracket 136 in position to coöperate with a keeper 141, which is adjustably mounted upon the upper end of the plunger 133 and is beveled so as to pass freely by the latch when moving downward. The operation of the latch is controlled by means connected with the picker-slide 120. The slide, as shown in Figs. 3 and 5, is provided with a lug 144, to which the upper end of a rod 143 is adjustably fixed. The lower end of this rod is provided with a shoulder 145 adapted to engage an arm 142 projecting from the latch. Within a longitudinal hole in the rod 143 slides a rod 146 having at its lower end a head 147, also adapted to coöperate with the arm 142 on the latch. The rod 146 is normally held in its upper position by means of a compression-spring 149 engaging a head 148 on the rod.

The operation of the latch-mechanism is as follows:—When the picker-slide 120 is depressed by the eccentric-mechanism, in the position A of the picker, and the extremity of the picker-stem engages the heel-lift 47, the spring 126 yields, as hereinbefore described, so as to permit the picker-stem to be arrested while the slide completes its downward movement. This action results in a relative movement between the bracket 136, on which the latch is pivoted, and the latch-operating rod 143, whereby the latch is swung into inoperative position, as shown in Fig. 3. At this time, however, the claw-cam 138 acts to depress the plunger 133 and throw the claws into operation, and also to depress the latch-keeper 141 into position to be engaged by the hooked extremity of the latch. During the subsequent withdrawing movement of the picker-slide the claw-cam continues to hold the claws in operative position while the spring 126 maintains the picker-stem in engagement with the lift at the top of the stack, in the position A of Fig. 3, and the resulting relative movement of the bracket 136 and the latch-controlling rods causes the head of the rod 146 to engage the arm 142 and swing the latch into engagement with the keeper 141. By the continued upward movement of the slide the picker then acts to raise the lift from the stack, and the latch acts to hold the claws in operation during this movement, and during the subsequent swinging movement of the picker-arm.

After the picker has withdrawn the topmost lift from the stack, as above described, it next moves to the position B of Fig. 3 so as to immerse the lift in paste in a receptacle 150 mounted in stationary position. This action is produced by the combination of the swinging movement of the arm and the longitudinal movement of the slide, the picker acting first to swing the lift over the paste receptacle and then to depress it therein. The picker then acts to raise the lift out of the paste receptacle and swing it into position above the device upon which the lifts of the partially-completed heel are supported during the assembling of the heel. This heel-support is not illustrated in Fig. 3, but one of the pickers, in the position indicated by the letter C, is shown in the act of depositing a lift upon the top of a partially-formed heel or pile of heel-lifts. When the picker-arm has been swung to the position C, the eccentric-mechanism acts to depress the slide 120, thereby, through the action of the stem, and the lift spring 126, forcing the stem, and the lift carried thereby, firmly downward so as to cause the lift to adhere to the top of the pile of assembled lifts. The throw of the eccentric is such that the downward movement of the slide 120 causes a substantial pressure to be applied to the lift being deposited, through the spring 126. The lower end 124 of the picker stem, which bears on the central portion of the lift, is the ultimate pressing agent and through this localized pressure the air is expelled from between the lifts and the paste is spread into a thin film. Those skilled in the art will recognize the increase in holding power obtained from a thin continuous film of paste and the improvement in the heels made by this method. After the pressure has been applied the continued compression of the spring 126 causes the claws to be released from the lift, since it results in a relative movement of the parts by which the latch is released through the action of the rod 143, as shown in Fig. 3. After depositing the lift as just described, the picker-stem is raised by the eccentric-mechanism, and the picker-arm is then swung back to the position A, thereby completing the cycle of operations of the picker. The path of movement followed by the lower extremity of the picker is represented approximately by broken lines in Fig. 3. This figure shows three pickers, adapted to deposit three successive heel-lifts, these pickers being in the relative positions which they occupy in the operation of the machine.

For convenience in manufacture the pickers are made in groups of three, the cycle of operation of one group being shown in Fig. 3. These groups may be duplicated to any desired extent and if the heel to be built does not require as many lifts as there are pickers, the extra pickers may be made inoperative by fastening them in position A of Fig. 3. It is evident that every fourth picker will be in similar position, thus if the first picker is engaging a lift from the stack the fourth will be in the same position while the second and third will be respectively in the paste and applying the lift to the heel pile. In the illustrated embodiment of the invention there are four of these groups of pickers operating to build up a 12 lift heel. As every fourth picker in the series operates similarly it is clear that four pickers are simultaneously depositing four lifts of different sizes at separated stations on the conveyer. By this convenient arrangement the capacity of the illustrated machine is increased greatly over other forms of heel-building machines.

In connection with the devices hereinbefore described for utilizing pieced lifts I use a picker of a form adapted to seize simultaneously each of the several pieces which constitute a lift. Such a picker is illustrated in Figs. 23 and 24. Here the lower end of the stem 124 is provided with a hollow enlargement 151 inclosed at the bottom by a plate 155 secured thereto by screws 156. This plate has three downward extensions 152, each of which is slotted to receive three claws similar to those previously described. The claws of each set are actuated by a short plunger 154, and the three plungers are mounted in a yoke 153 screwed to the lower end of the plunger 129 and moving vertically within the enlargement 151 on the stem. This arrangement is such that, as shown by Fig. 23, each piece of the lift is engaged by three claws, and these claws operate simultaneously so that the pieces to form a complete lift are simultaneously engaged and are held and transferred by the picker in their assembled position.

When the picker acts to seize a lift or its component pieces, as above described, it is necessarily forced against the top of the stack with substantial pressure in order to insure the entrance of the claws into the material. At this time, however, the clamping devices are operative to hold the stack and prevent downward yielding thereof, and this constitutes, therefore, a further function of these devices.

When a heel-lift is immersed in the paste by the picker, both of its lateral surfaces are covered with paste, with the exception of the small portion of the upper surface engaged by the picker, and this is a novel and valuable feature in the operation of the machine as it results in more securely pasting the heel-lifts together. The edges of the material are also coated with paste and this is a feature of utility in connection with pieced lifts since it results in the contiguous edges of the pieces of each lift being pasted together so as to produce a solid lift and a heel without open joints.

The heel-support hereinbefore referred to, upon which the lifts are supported while they are being assembled by the pickers and during subsequent operations on the heel, is in the form of a conveyer-chain. This chain comprises links 157, each in the form of an open frame provided with a sheet-metal bottom 158, and each of the links 157 constitutes a receptacle for a heel. Between the links 157 are connecting-links 159, which are pivoted together and to the links 157, as shown particularly in Fig. 1. At each pivotal connection the chain is provided with outwardly-extending pins, upon which are journaled rolls 160, and these rolls are utilized both to actuate the chains to advance the heel-receptacles through the machine, and to lock the chain at the moments when it is necessary that the heel-support be immovable.

The upper portion, that is, the operative portion of the chain, is supported upon an inverted channel-shaped member 161, which is fixed at its end to members 119 and 139 of the frame of the machine. The chain is guided upon this supporting member as shown in Fig. 11. Each of the plates 158 is provided with a central perforation, through which surplus paste may escape, and the supporting member 161 is provided with drain-passages 162, and with lateral troughs 163, in which the paste may collect.

At one end of the machine the chain is supported upon a sprocket 164. At the other end of the machine the chain passes over a sprocket 165, and thence downwardly and under a third sprocket 166, and from the latter sprocket it returns to the sprocket 164. Provision is made for adjusting the tension of the chain, by journaling the sprocket 166 on an arm 167, pivoted at 168 to the frame of the machine. An adjustable distance-rod 169 connects the arm 167 with the bracket 170 on which the sprocket 165 is journaled, and by adjusting this distance-rod the sprocket 166 may be raised or lowered to vary the tension of the chain.

The mechanism by which the chain is actuated and locked is illustrated particularly in Figs. 10, 11, 27 and 28. This mechanism comprises a shaft 171 which has round ends adapted both to rock and to slide longitudinally in bearing-lugs 172 on the frame of the machine. This shaft is arranged along one side of the horizontal portion of the chain, as shown in Fig. 11, and through the greater part of its length it is square for convenience in fixing sleeves to the shaft. The longitudinal movements are imparted to the shaft 171 through a sleeve 173 fixed near one end of the shaft and provided with lugs 174 embracing a roll 175 on the upper end of a cam-lever 176. The cam-lever is pivoted at 177 on the frame of the machine, and it carries a cam-roll 178 engaging a cam 179 on a cam-shaft 180. The cam-shaft is journaled in the frame of the machine. The rocking movements of the shaft 171 are produced through a sleeve 181, through which the shaft may slide but not rotate, and provided with an arm 182. This arm is pivoted to a connecting-rod 183, which is pivoted, at its lower end, to a cam-lever 184 pivoted at 185 on the frame of the machine. This cam-lever carries a cam-roll 186 engaging a cam 187ª, also mounted on the cam-shaft 180.

The conveyer-chain is actuated and locked by the engagement of the rolls 160, hereinbefore referred to, with lugs mounted on the sleeves 173 and 181 and upon other sleeves fixed to the shaft 171. Two lugs 187 on the sleeve 173 embrace one of the rolls 160, as shown in Fig. 27. In this figure and in Fig. 28 the rolls 160 are shown in the position which they occupy with relation to the mechanism just described, while the chain itself is not shown, the pins upon which the rolls are journaled being shown in cross-section.

With the roll 160 between the lugs 187, a longitudinal movement of the shaft 171 produces a corresponding movement of the horizontal part of the chain. In order that all of the operative links of the chain may be moved with precision, the shaft 171 is provided with a number of sleeves 188, each of which carries lugs 189 similar in function to the lugs 187, and thus each of the links 157 is moved positively forward at the proper time. The amplitude of this movement is such as to bring each of these links successively under each of the picker-mechanisms, and the precision of the operation of the conveyer and of the picker is such that no other means are necessary for gaging the positions in which the heel-lifts are deposited one upon the other. In this manner the use of a form or matrix in which to deposit the heel-lifts is not essential.

After the chain has been advanced as just described, the shaft 171 is rocked, by means described for that purpose, thereby disengaging the lugs 187 and 189 from the rolls 160 and at the same time throwing the locking-means into action. These means comprise lugs 190 arranged in pairs on the sleeve 181 and upon similar sleeves 193, these lugs being arranged to embrace the rolls 160. Segmental lugs 191 are provided upon the sleeves 181 and 193 which are engaged by fixed lugs 192 on the frame of the machine, whereby the sleeves may rock with the shaft 171 but may not move laterally with it. By these means the shaft 171 and the chain-links are locked accurately and securely against longitudinal movement at the moment when one or more of the pickers is depositing a heel-lift. The cycle of movement of the mechanism is completed by a further rocking movement of the shaft 171, by which the locking-lugs, as well as the actuating-lugs, are disengaged from the rolls 160, and a reverse longitudinal movement by which the shaft returns to its original position.

In addition to the mechanism hereinbefore described for assembling heel-lifts, the machine is provided with means for nailing the heels. Means suitable for this purpose are well known and any usual or convenient devices may be employed. In the machine illustrated, the movement of the conveyer-chain carries each heel in succession over a nailing plunger 194, shown in dotted lines in Fig. 10. This plunger is actuated by a toggle 195. The toggle is moved by an adjustable connecting-rod 196 pivoted to the lower end of a cam-lever 197. The cam-lever is pivoted to the frame of the machine, and its upper end, as shown in Fig. 9, carries a cam-roll engaging a cam-path on a cam 204 mounted on the cam-shaft 116 hereinbefore referred to. The nails are received from a nail-carrier 198, which is mounted upon a slide 199. The slide moves horizontally in bearings on the bracket 170, and is actuated by a rod 200 pivotally connected with the lower end of a cam-lever 201, which is pivoted upon the frame of the machine. The cam-lever carries a cam-roll 203 (Figs. 1 and 9) which engages a cam-path on the inner surface of a cam-disk 205.

Coöperating with the nailing-plunger is an upper pressing-plunger 206, which slides vertically on the frame of the machine so as to engage the upper surface of the heel, and this plunger is actuated by a toggle 207. The central pivot-pin of the toggle engages a vertical slot in a head 208, shown in dotted lines in Fig. 1, and this head is fixed on a rod 209, which slides in bearings 210 on the frame of the machine. The rod 209 carries a cam-roll 211, which engages a cam-path on the cam 204, as shown in Fig. 9. This mechanism operates to depress the plunger 206 against the uppermost lift of the heel at the time when the nailing plunger operates from beneath, and the nails enter the heel through the opening in the plate 158 upon which the heel lifts are supported, the upper ends of the nails being clenched against the plunger 206. It will be observed that in addition to the function of pressing the heel the plunger 206 also functions to rigidly support the conveyer during the heel nailing operation. The heel is nailed while on the conveyer to increase the speed of operation of the machine, but obviously the conveyer is not rigid enough to sustain the impact of the nailing plunger 194 and, therefore, a support at the other side of the heel, namely the pressing-plunger 206, is provided to lend rigidity to the conveyer when the nailing plunger is operated.

The upper end of the toggle 207 is pivoted to a vertical slide 212, which is normally clamped in place by a plate 213 so as to constitute a fixed support for the toggle. When it is necessary to adjust the position of the plunger 206 according to the thickness of the heels to be produced, this is accomplished by loosening the screws which hold the plate 213 against the slide 212, and the slide may then be moved vertically to the required degree. To prevent accidental movement of the slide a block 214 is inserted between the upper end of the slide and a lug 215 on the frame of the machine. When the slide is to be adjusted, as above described, the block 214 is removed and a block of different thickness substituted.

After the heels have been subjected to the pressing and nailing operation, they are carried by the conveyer-chain to the right of the machine, where they are confined between the chain and a cover-plate 216, shown in Fig. 10, until they are carried to the lowermost part of the chain, where it passes beneath the sprocket 166. Here the links carrying the heels are in inverted position, so that the heels are discharged and fall into a suitable receptacle. To prevent accidental sticking of any of the heels upon the chain, means are provided for ejecting the heels positively from the chain at this point. This ejector comprises a finger 217, shown in dotted lines in Fig. 10, mounted upon a lever 218, which is pivoted upon the arm 167. A rod 219 is pivoted to one end of the lever and the upper end of this rod is bent horizontally to engage a curved cam-slot in a plate 220 mounted on the toggle 195. (Fig. 1). At each operation of the toggle the ejecting mechanism operates, and the finger 217 is thrust through the opening in the plate 158 which at the time is beneath the ejector, so that the finger engages the heel and frees it from the plate.

The power by which the machine is operated is derived from a pulley 221 (Fig. 2) which is loosely mounted upon the cam-shaft 180 and is connected with any suitable source of power. The pulley drives the shaft through a ball-clutch 222, which may be of any ordinary or suitable form and is not particularly illustrated. The shaft 180 carries a pinion 223, meshing with an intermediate gear 224, which drives a gear 225 fixed to the cam-shaft 116, whereby the latter is rotated. The eccentric-shaft 113 is actuated by a gear 226, meshing with the gear 225, and the diameters of these gears have the ratio of three to one, whereby the eccentrics are rotated at the proper speed to cause them to operate as hereinbefore described. The cam-shaft 78 is actuated by gears 227 and 228, on this shaft and the shaft 113, respectively.

In order that the machine may be started and stopped by the operator, the ball-clutch is provided with a lug 229, by which it may be tripped in a manner common in such devices. This lug coöperates with a detent 230 mounted in the upper end of an arm 231, which is fixed to a rock-shaft 232 journaled on the frame of the machine. A second arm 234 depends from the rock-shaft and is pivoted to a horizontal connecting-rod 237, which is pivoted at 238, as shown in Fig. 1, to a vertical hand-lever 239 arranged in convenient position to be moved by the operator of the machine. The lower end of the hand-lever is pivoted, for convenience, upon the pivot rod 55 hereinbefore referred to. When the hand-lever is moved to the right (Fig. 1), the detent 230 is brought into the path of movement of the stop-lug 229 on the clutch, and the lug is thus arrested, and the clutch thrown out of operation, thereby bringing the cam-shaft 180 to rest, while the pulley continues to rotate. A latch 240 is mounted upon the arm 231, beneath the detent, to engage the stop-lug and prevent rebound, in a manner common in such devices. When the operator desires to start the machine again, this is accomplished by moving the hand-lever in the direction opposite to that above described, thereby releasing the stop-lug and permitting the clutch to operate again.

In addition to the manually operative means for stopping and starting the machine, means are provided for stopping the machine automatically when the lifts or the pieces of leather in any one of the stacks are nearly or wholly exhausted. To this end, a rock-shaft 243 (Fig. 1) is journaled in the frame of the machine and is provided with arms 242, each arm being arranged beneath one of the weights 50 and provided with an adjustable screw 241 which is engaged by the weight when the latter, in the course of its descent, has reached a position corresponding to the uppermost position of the follower actuated by the weight. Through this engagement, the shaft 243 is rocked, and an arm 270, fixed to the shaft, rocks a lever 244 which is pivoted at 245 upon the frame of the machine. The lever 244 draws down a rod 246 connecting the lever with an arm 247 fixed to the rock-shaft 232. The shaft is thus rocked, and the stop-arm 231, hereinbefore described, is thrown into operative position so as to throw the clutch out of operation.

In addition to stopping the machine automatically when the heel-lifts are exhausted as above described, it is desirable to stop it automatically in any case in which, through faulty operation of the machine or through the presence of a defective heel-lift, any one of the pickers fails to properly transfer a lift from the stack to the heel-support. The mechanism for accomplishing this result is illustrated particularly in Figs. 2 and 25. A feeler 248 is arranged adjacent to each picker, in position to be engaged by the edge of a heel-lift carried by the picker when the latter is in the position C of Fig. 3, which is the position illustrated in Fig. 25. This feeler constitutes part of a yoke-shaped member, having an upper extension 249 adapted to be engaged by the picker-arm 112 in case there is no lift upon the picker so that the feeler is not engaged in the normal manner. The yoke-shaped member is mounted upon a stem 250 fixed on a slide 251, and the slide moves horizontally in a slide-guide 252 fixed on the frame of the machine. A spring 253 normally moves the slide, and the parts carried thereby, to the right of the position illustrated in Fig. 25, this movement being limited by adjustable nuts on the left-hand end of the stem 250.

The slide 251 carries a plunger 254 which is free to move vertically in the slide. A compression-spring 255 normally retains this plunger in elevated position, the upward movement of the plunger being limited by a head 256 on its lower end. The plunger is actuated by means of an arm 257 fixed to a rock-shaft 258 journaled in the frame of the machine, as shown in Fig. 2. This rock-shaft carries an arm 260, at the free end of which is a cam-roll 261 engaging a cam 262 on the cam-shaft 116. A spring 263, connected with an arm 264 also fixed to the rock-shaft 258, maintains the cam-roll 261 in engagement with the cam and causes the upward movement of the arms just referred to.

The plunger 254 coöperates with an arm 120

265, which is fixed upon a rock-shaft 266 journaled in the frame of the machine. The arm 265 is held normally in engagement with the plunger by means of a compression-spring 269 connected with the arm by a rod 268 pivoted to the arm, as shown in dotted lines in Fig. 2. The rock-shaft 266 carries a stop-arm 267, which is provided with a detent adapted to coöperate with the stop-lug 229 of the clutch in the manner hereinbefore described in connection with the detent 230. It will be understood that there are as many feelers, together with their associated mechanisms, as there are pickers. When the picker corresponding to a given feeler arrives in the position of Fig. 25, one of the three projections on the cam 262 is in position to engage and operate the arm 260 and thereby to depress the arm 257. The latter arm is provided with a lug 259 which projects laterally above the position normally occupied by the plunger 254. If a lift is properly held by the picker, the feeler is moved to the position shown in dotted lines in Fig. 25, thereby carrying the plunger beyond the path of movement of the lug 259 and into the position shown in dotted lines in said figure, so that when the lug 259 descends it does not engage the plunger and the latter remains in elevated position. If, on the other hand, there is no lift upon the picker, then the engagement of the picker arm 112 with the projection 249 moves the slide and the plunger to the position of Fig. 25, with the plunger directly beneath the lug 259. The plunger is therefore depressed, carrying with it the arm 265, and thus throwing the stop-arm 267 into operation to trip the clutch and stop the machine.

In order that the operator may throw the machine into operation after it has been automatically stopped as above described, the head 236, by which the rod 237 is connected with the arm 234 of the manual stop-mechanism, is provided with a slot 271 (Figs. 2 and 26) which receives a stud 272 on a lever 273, which is pivoted at its lower end on the frame of the machine. The upper end of the lever 273 is forked and engages a stud 274 on the lower end of one arm 275 of a bell-crank lever loosely pivoted on the rock-shaft 266. The other arm 276 of the bell-crank lever is connected, by a tension spring 277, with an arm 278 fixed to and depending from the rock-shaft 266. By an extreme movement to the left of the hand-lever 239 (Fig. 1) the mechanism just described may be operated to rock the shaft 266 so as to throw the stop-arm 267 out of operation and permit the machine to start again.

It is well known that heel-building machines have heretofore been proposed in which a number of heel-lifts are automatically assembled and secured together. In this machine since the successive lifts of the heel may be taken from different hoppers, heels of any desired contour or pitch may be formed, because all or as many as may be desired of the lifts, may be of different sizes. If it is desired to produce a Cuban or a military heel, each successive hopper may be supplied with lifts of slightly smaller size than those in the previous hopper, thus producing a heel diminishing in diameter toward the top-lift. While the heel is necessarily shaped to its final size and form after the lifts have been assembled in the present machine, the capacity for operating in the manner just described effects an important economy in material, as it makes possible the use of lifts, in all portions of the heel, of a size providing for immediate introduction into a heel compressing machine.

Owing to the use of a conveyer chain for moving the lifts from place to place in the machine, this machine is particularly adapted to coöperate with other machines by which the heel is automatically compressed, since the conveyer-chain, in such a case, may be merely extended from one machine to another so as to carry the work continuously through the several mechanisms.

The feature of the invention which relates to the novel construction of the heel-lift carrier or picker, *per se* is not claimed broadly herein, as this mechanism, when used as a blank handling tool of general utility, forms the subject matter of a divisional application filed November 1, 1915, Serial No. 59,031.

Likewise, the novel method of building heels in multiple, which is disclosed in the foregoing description, is not claimed herein as this method forms the subject-matter of a divisional application filed June 20, 1918, Serial No. 240,962.

Nothing herein contained is to be interpreted as limiting the invention in the scope of its application to use in connection with the particular machine, or the particular mode of operation, or both, selected for purposes of illustration and explanation. While the particulars of construction herein set forth are well suited to one mechanical form of the invention, it is not limited to these details of construction nor to the conjoint use of all its features, nor is it to be understood that these particulars are essential since they may be variously modified within the skill of the artisan without departing from the true scope of the actual invention, characterizing features of which are set forth in the following claims by the intentional use of generic terms and expressions inclusive of various modifications. In this connection particular attention is called to the use, throughout the specification and claims, of the terms "heel-lift" or "lift" to designate the layer or blank handled by the working tools of the machine. These terms are used herein in an inclusive sense as defining any blank or layer of material capable of being handled by tools of the character described, more particularly such blanks as are useful in the formation of a heel pile from which a heel is ultimately produced, irrespective of the particular shape of the blank or the nature of the material of which it is composed.

What is claimed as new, is:—

1. A heel-building machine, having, in combination, means for holding a series of stacks of heel-lifts of different sizes, and means for withdrawing lifts from the several stacks in succession and positively assembling them in a predetermined, relative location to form a heel of predetermined contour, substantially as described.

2. A heel-building machine, having, in combination, a series of interchangeable hoppers for holding stacks of heel-lifts of different sizes, and means for withdrawing lifts from a plurality of hoppers in succession and positively assembling them in a predetermined, relative location to form a heel of predetermined contour, substantially as described.

3. A heel-building machine, having, in combination, a heel-support, a plurality of means for seizing and depositing heel-lifts thereon, and mechanism for moving the heel-support to said depositing means successively so as to produce a pile of lifts on the heel-support, said means, when operating, being immovable in the line of travel of the said heel support, substantially as described.

4. A heel-building machine, having, in combination, a heel-support, means for holding a series of stacks of heel-lifts, means for removing and applying paste to a lift from each stack, and depositing the lift on the heel support, and means for moving the heel-support to bring the latter into alinement with the stacks in succession so as to cause a lift from each stack to be deposited on the heel-support, substantially as described.

5. A heel-building machine, having, in combination, means for holding a series of stacks of heel-lifts, a plurality of means for withdrawing lifts singly from each stack, said means operating successively, and means for moving the lifts so withdrawn from each of said withdrawing means to another, in succession, so as to produce a pile of lifts adapted to form a heel, substantially as described.

6. A heel-building machine, having, in combination, means for feeding the component pieces of a pieced heel-lift substantially in their assembled heel-lift position, and means for applying paste to both sides of each lift, superposing the lifts in a stack, and pressing the lifts together to cause them to cohere, substantially as described.

7. A heel-building machine, having, in combination, means for holding a stack of heel-lifts, a paste-receptacle, a heel-support, and automatic transferring means for seizing a lift in said stack, removing it from the stack, and inserting it in the paste-receptacle and withdrawing it from the paste-receptacle and placing it on the heel-support, substantially as described.

8. A heel machine, having, in combination, feeding-means adapted to present heel-lifts in a definite position, a lift-support, and means for seizing a lift so presented, holding it positively and transferring it to the support, and depositing it thereon in a position having a definite relation to the position in which it is presented by the feeding-means, substantially as described.

9. A heel building machine, having, in combination, a heel support, a series of holders adapted to contain stacks of heel lifts of different sizes respectively, means for feeding the stacks of lifts in the holders, and means for transferring the lifts from the feeding means to and superposing them in contact with each other in a predetermined location on the heel support with their breast edges alined, substantially as described.

10. A heel machine, having, in combination, means for feeding heel-lifts one by one, a lift-support, and a transferring-device operating to seize each lift and hold it with its breast-edge in a definite position, and to transfer the lift to the support and deposit it with its breast-edge in definite position thereon, substantially as described.

11. An automatic shoe machine, having, in combination, means for holding a stack of heel-lifts, a work-support, means operating intermittently to clamp the lifts near the end of the stack with the exception of the end lift at least, and means operating, while the lifts are so clamped, to seize the end lift and thereafter to transfer it to the work-support, substantially as described.

12. An automatic shoe machine, having, in combination, means for holding a stack of heel-lifts, a work-support, means operating intermittently to clamp the lifts near the end of the stack, with the exception of the end lift at least, with their breast-edges in alinement, and means operating, while the lifts are so clamped, to seize the end lift and thereafter to transfer it to the work-support, substantially as described.

13. An automatic shoe machine, having, in combination, means for feeding the component pieces of a pieced heel-lift, substantially in their assembled heel-lift position, a work-support, and means for transferring said pieces simultaneously and in assembled position to the work-support, substantially as described.

14. A heel-building machine, having, in combination, means for feeding the component pieces of a pieced heel-lift substantially in their assembled heel-lift position, a heel-support, and means for seizing said pieces simultaneously, applying paste to the pieces, and transferring them in assembled position to the heel-support, substantially as described.

15. An automatic shoe machine, having, in combination, means for holding stacks of the component pieces of a pieced heel-lift with said pieces substantially in assembled heel-lift position, a work-support, and means for engaging simultaneously a piece from each of said stacks and transferring the pieces so engaged, in assembled position, to the work-support, substantially as described.

16. A heel-building machine, having, in combination, means for holding stacks of the component pieces of a pieced heel-lift with said pieces substantially in their assembled heel-lift position, a heel-support, and means for engaging simultaneously a piece from each of said stacks, applying paste to the pieces so engaged, and transferring them, in assembled position, to the heel-support, substantially as described.

17. A heel-building machine, having, in combination, means for holding stacks of the component pieces of a pieced heel-lift with said pieces substantially in their assembled position, a heel-support, a paste-receptacle, and means for engaging simultaneously a piece from each of said stacks, introducing the pieces so engaged into the paste-receptacle, and transferring the pieces, in assembled position, to the heel-support, substantially as described.

18. An automatic shoe machine, having, in combination, means for holding stacks of the component pieces of a pieced heel-lift, means for alining the end pieces in said stacks with relation to their breast-edges and in assembled position, a work-support, and means for transferring the pieces so assembled to the work-support and depositing them with their breast-edges in definite position thereto, substantially as described.

19. An automatic shoe machine, having, in combination, an inclined hopper arranged to receive a stack of heel-lifts with their breast-edges against the lower side of the hopper, means for moving the stack upward in the hopper, a work-support, and means operating to seize the uppermost lift in the stack at a definite distance from its breast-edge, transfer it to the work-support, and deposit it thereon with its breast-edge in definite position, substantially as described.

20. An automatic shoe machine, having, in combination, a holder adapted to contain a stack of heel lifts, or the like, means for feeding said lifts toward one end of the holder, a heel-lift support, and means for transferring the heel-lifts from the holder to the heel-lift support, said transferring means having impaling devices arranged to enter the face of a lift so as to seize the lift and hold it positively during the transferring operation, substantially as described.

21. An automatic shoe machine, having, in combination, a holder adapted to contain a stack of heel lifts, or the like, means for feeding said lifts toward one end of the holder, a heel-lift support, and means for transferring the lifts from the holder to the heel-lift support, said transferring means having a plurality of claws arranged to enter the face of a lift obliquely in different directions so as to seize the lift and support it during the transferring operation, substantially as described.

22. An automatic shoe machine, having, in combination, a holder adapted to contain a stack of heel lifts, or the like, means for feeding said lifts toward one end of the holder, a heel-lift support, and means for transferring the lifts from the holder to the heel-lift support, said transferring means having a plurality of claws arranged to enter the face of the lift obliquely and radially so as to seize the lift and to support it during the transferring operation, substantially as described.

23. A heel-building machine, having, in combination, a paste-receptacle, a heel-support, and means operating to seize a piece of heel-material, support it, insert it in the paste receptacle, and transfer it to the heel-support, said means engaging only a limited portion of the surface of the piece, so as to apply paste over the greater portion of the sides and the edges of the piece, substantially as described.

24. A heel-building machine, having, in combination, a heel-support, means for feeding the component pieces of a pieced heel-lift substantially in their assembled heel-lift position, means for applying paste to the sides and the edges of the pieces, and means for depositing the pieces in assembled position on the heel-support, substantially as described.

25. A heel-building machine, having, in combination, a heel-support, means for feeding the component pieces of a pieced heel-lift, a paste-receptacle, and means operating to hold said pieces in their assembled position, insert them in said position in the paste receptacle, and transfer them to the heel-support, substantially as described.

26. An automatic shoe machine, having, in combination, means for holding a stack of heel-lifts or the like, a heel-lift support, means for transferring the lifts singly from the stack to the heel-lift support, said means having impaling devices and mechanism for forcing the impaling devices into engagement with the end lift in said stack, and means for clamping the heel-lifts in the stack by their edges, during the impaling operation, to support the stack, substantially as described.

27. An automatic shoe machine, having, in combination, a heel-lift support, a series of holders adapted to contain stacks of heel-lifts respectively, means for feeding the heel-lifts contained in each holder to the support, one by one, and automatic means to stop the machine when the feeding means fails to deliver a heel-lift to the support, substantially as described.

28. An automatic shoe machine, having, in combination, a work support, a series of holders adapted to contain stacks of heel-lifts respectively, means for feeding the heel-lifts from the holders to the work-support, and automatic means for stopping the machine when the supply of lifts in any holder becomes exhausted, substantially as described.

29. A heel-building machine, having, in combination, a series of holders adapted to contain stacks of heel-lifts respectively, a series of lift transferring devices, one for each stack, a series of work-supports presented in succession to said devices, a paste supply, and means to actuate said devices to engage a lift on each stack, apply paste thereto, and press it upon the work-support which is opposite the device, substantially as described.

30. A heel-building machine, having, in combination, a traveling support, a plurality of hoppers for holding heel-lifts, means for engaging and withdrawing a lift from each hopper, and mechanism for operating said means to transfer said withdrawn lifts to the support to build a heel, substantially as described.

31. A heel building machine, having in combination, a plurality of hoppers adapted to contain lifts of different sizes respectively, and automatic means for engaging and withdrawing a lift from each hopper and positively superposing them on each other in a predetermined, relative location, substantially as described.

32. A heel-building machine, having, in combination, a plurality of hoppers, means for successively withdrawing the end lift by engagement with its face from each hopper, and mechanism for operating said means to superpose the withdrawn lifts on each other to build a heel, substantially as described.

33. An automatic shoe machine, having, in combination, a holder adapted to contain a stack of heel-lifts, means for removing the lifts, one by one, from one end of the holder, means for retaining the stack of lifts in the holder, means for clamping the lifts near the delivery end of the stack with the exception of the end lift at least, and mechanism for operating said means intermittently, substantially as described.

34. A heel building machine, having, in combination, means for holding a series of stacks of lifts of different sizes, and means for withdrawing groups of lifts consisting of lifts of different sizes, from the several stacks in succession and positively assembling them in a predetermined, relative location to form heels of predetermined contour, substantially as described.

35. A heel building machine, having, in combination, means for holding a series of stacks of lifts, a conveyer, a series of heel supports carried thereby, and positive means for withdrawing lifts from the stacks and depositing them in piles on several supports simultaneously, substantially as described.

36. A heel building machine, having, in combination, a plurality of hoppers adapted to contain stacks of lifts of different sizes respectively, and means for simultaneously withdrawing a plurality of lifts of different sizes from the tops of said hoppers and positively assembling them to form heels of predetermined contour, substantially as described.

37. A heel building machine, having, in combination, a series of hoppers for holding heel lifts, a traveling heel support, means for moving the heel support successively to positions opposite the several hoppers, and positive means for withdrawing lifts from the hoppers and depositing a withdrawn lift on the heel support when it is opposite each hopper, substantially as described.

38. A heel building machine, having, in combination, a row of hoppers adapted to contain lifts, a conveyer provided with a surface adapted to sustain a pile of lifts, means for feeding the conveyer along the row of hoppers, and positive means for engaging and withdrawing the lifts from the hoppers and superposing them on said surface, substantially as described.

39. A heel building machine, having, in combination, a row of hoppers adapted to contain stacks of lifts respectively, a conveyer provided with a surface for receiving a pile of lifts, means for feeding the conveyer along the row of hoppers, means for piling lifts on said surface, and means for nailing together said pile of lifts while on the conveyer, substantially as described.

40. A heel building machine, having, in combination, a row of hoppers adapted to contain stacks of lifts respectively, a heel support for receiving a pile of lifts, means for feeding said support along the row of hoppers, means for piling lifts on said support, means for nailing together said pile of lifts while on the support, and means for ejecting the secured pile of lifts from the support, substantially as described.

41. A heel building machine, having, in combination, means for holding a stack of heel-lifts, a segregated paste receptacle, means for feeding heel-lifts one by one, and means for applying paste to both sides of each lift, superposing the lifts in a stack and pressing them together to cause them to cohere, substantially as described.

42. A heel building machine, having, in combination, means for holding a series of stacks of heel-lifts, a paste receptacle for all the stacks in the series, means for supporting a series of lifts delivered from the stacks, said parts being arranged at separate stations, and means for repeatedly taking series of heel-lifts from the stacks and transferring each series to the other stations in succession, substantially as described.

43. A heel building machine, having, in combination, means for holding a stack of heel-lifts, means for successively removing the heel-lifts from the stack by engagement with their faces, and means for applying paste to each lift, substantially as described.

44. A heel building machine, having, in combination, a plurality of hoppers adapted to contain lifts, a plurality of supports spaced from each other, and means for simultaneously withdrawing a plurality of lifts from said hoppers and positively depositing them on said supports, substantially as described.

45. A heel building machine, having, in combination, a row of hoppers adapted to contain stacks of lifts respectively, a conveyer provided with a heel supporting surface for receiving a pile of lifts, means for feeding said surface along the row of hoppers, means for removing a lift from each hopper and superposing them in a pile on said surface, and means for applying paste to each lift after its removal, substantially as described.

46. A heel building machine, having, in combination, a plurality of alined hoppers, means for successively withdrawing lifts from each hopper, and mechanism for operating said means to superpose the withdrawn lifts on each other, said means acting to withdraw the lifts in a direction transverse to the line of the hoppers, substantially as described.

47. A heel-building machine, having, in combination, means for holding a series of stacks of heel-lifts of different sizes, and means for withdrawing lifts from the several stacks by engagement with the faces of the lifts and assembling them to form a heel of predetermined contour, said means retaining control of said withdrawn lifts during their transfer from the stacks to the assembling point, substantially as described.

48. An automatic shoe machine, having, in combination, a heel-lift support, a container adapted to retain heel-lifts in stack formation, means for feeding said lifts toward one end of the container, a device for penetrating the face of a lift in the stack and transferring it to the support, and means for releasing the lift from the control of said device after it has been transferred to said support, substantially as described.

49. An automatic shoe machine, having, in combination, a container adapted to retain heel lifts in stack formation, means for advancing the lifts within the container, means operating to intermittently clamp the lifts near one end of the stack while leaving the end lift free to be removed, and means operating while the lifts are so clamped to remove the end lift from the stack, substantially as described.

50. An automatic shoe machine, having, in combination, a container adapted to retain heel lifts in stack formation, means for withdrawing the lifts singly from one end of the stack comprising a picker and mechanism for causing the picker to intermittently seize and remove the end-most lift, means for advancing the lifts within the container, and means for clamping a portion of the lifts in the rear of the end-most lift while said lift is being seized by the picker, substantially as described.

51. An automatic shoe machine, having, in combination, a container adapted to retain heel lifts in stack formation, means for advancing the lifts within the container, an intermittently operating device adapted to remove the end-most lift from the stack, an abutment arranged in the path of movement of the lifts to arrest their advance when the end-most lift is in position to be removed by said device, and means for intermittently withdrawing said abutment to permit said device to operate, substantially as described.

52. An automatic shoe machine, having, in combination, a container adapted to retain heel lifts in stack formation, means for advancing the lifts within the container, an intermittently operating device adapted to withdraw the end-most lift from the stack, a pair of lift holders to engage and limit the advance of the lifts within the container and position the end-most lift for withdrawal by said device, means for moving said holders across the end of the stack while the lifts are being advanced, and means for removing said holders from lift retaining position to permit said lift withdrawing device to operate, substantially as described.

53. An automatic shoe machine, having in combination, a container adapted to retain heel lifts in stack formation, means for advancing the lifts within the container, a device for engaging and removing the lifts from one end of the stack, means movable into the path of said lifts to be engaged thereby and arrest their advance movement when the end-most lift is in position to be removed by said device, means for clamping a portion of the lifts in the rear of said end-most lift, and mechanism for operating said last two named means alternately prior to the operation of said lift withdrawing device, substantially as described.

54. A heel building machine, having, in combination, a series of spaced containers adapted to retain lifts, a heel lift support, means for repeatedly removing a series of lifts from said containers and depositing them on said support at points opposite the containers from which they are taken, means for intermittently advancing the lifts thus deposited past the containers a distance equal to the spacing of the containers, and means for applying paste to each lift after it is removed whereby a series of heel piles are simultaneously built, substantially as described.

55. A heel building machine, having, in combination, a series of containers adapted to retain lifts, a device coöperating with each container for removing a lift therefrom, a support, means for operating said removing devices to repeatedly deposit a series of lifts in a row on the support, one series over another, whereby to build a plurality of heels simultaneously, and means for securing together the lifts forming each heel pile, substantially as described.

56. A heel building machine, having, in combination, a series of containers each adapted to retain heel lifts, a support extending adjacent said series of containers, and means for repeatedly removing lifts from a plurality of said containers, applying paste to each separate lift and piling the lifts removed at each successive operation on those previously removed, whereby to build a plurality of heels simultaneously, substantially as described.

57. A heel building machine, having, in combination, a series of hoppers each adapted to contain a stack of heel lifts, and means for building a plurality of heels simultaneously from said lifts comprising a series of lift removing devices one for each hopper, means for causing a selected number of said devices to remove lifts from their respective hoppers, and means for thereafter causing different, selected, equal numbers of said devices to remove lifts from their respective hoppers and deposit them on the lifts previously removed, substantially as described.

58. A heel building machine, having, in combination, a series of spaced hoppers each adapted to contain a stack of heel lifts, and means for building a plurality of heels simultaneously from said lifts comprising a support adjacent said hoppers, means for depositing lifts on said support from a selected number of hoppers, means for advancing said lifts to stations opposite a second, selected, equal number of hoppers, and means for depositing lifts from said second selected number of hoppers on the lifts first deposited on the support, and so on until lifts have been deposited from all the hoppers in the series, substantially as described.

59. A heel building machine, having, in combination, a plurality of alined holders each adapted to contain a stack of lifts, a traveling conveyer adapted to advance lifts delivered from the stacks in a predetermined path relative to the stacks, means for successively withdrawing lifts from the stacks, and mechanism for operating said means to positively deliver the withdrawn lifts to the control of said traveling conveyer by a movement in a direction transverse to the path of movement of the conveyer, substantially as described.

60. An automatic machine, having, in combination, a heel-lift support, a series of holders adapted to contain stacks of heel-lifts respectively, means for feeding the heel-lifts contained in each holder to the support, one by one, a feeler for engaging each lift and detecting its delivery to the support, and automatic means for stopping the machine when the feeler fails to engage a lift, substantially as described.

61. A heel building machine, having, in combination, a series of holders adapted to contain stacks of heel-lifts respectively, a paste trough for all of said stacks, and means for successively removing series of lifts from the stacks by engagement with their faces and for applying paste from said trough thereto, substantially as described.

62. An automatic shoe machine, having, in combination, a holder adapted to contain heel-lifts, or the like, in a regular order, a heel-lift support, means for transferring heel-lifts from the holder to the support, said transferring means having impaling devices arranged to enter the face of a lift so as to seize the lift and hold it positively during the transferring operation, and means for presenting the lifts in the holder within the range of movement of said transferring means, substantially as described.

63. An automatic shoe machine, having, in combination, a holder adapted to contain heel-lifts, or the like, in a regular order, a heel-lift support, a paste receptacle between the holder and support, means for transferring heel-lifts from the holder to the support, said transferring means being constructed to seize the lifts by their faces, actuating means for said transferring means operating to always bring said means to a definite point, and means for invariably presenting a heel-lift at said point, to be seized, substantially as described.

64. A heel making machine, having, in combination, a conveyer composed of a series of flexibly connected heel supports each comprising a lift receiving seat, means to deliver lifts in stack formation on said supports, and means to advance said conveyer to bring each support successively into a horizontally disposed lift receiving position, and to an inverted discharging position, substantially as described.

65. A heel making machine, having, in combination, a conveyer composed of a series of flexibly connected heel supports each comprising a lift receiving seat, means movable to and from the heels assembled on said supports to press together the lifts composing said heels, and means to drive the conveyer to advance the supports successively into lift receiving position, substantially as described.

66. A heel making machine, having, in combination, a conveyer, for a plurality of heel piles, composed of a series of connected heel supports each comprising a seat for the heel piles, means for supporting said conveyer in such manner that each support travels in a fixed orbit, and means to advance said conveyer to bring each support successively into a horizontally disposed heel pile receiving position, and to an inverted heel pile discharging position, substantially as described.

67. A heel building machine, having, in combination, a holder for heel-lifts, a lift transferring device operating to engage single lifts, a lift support, means for moving said device to engage lifts successively at the holder and deposit them flatwise in a definite position on the support, and means for applying pressure to the face of each lift through said device, when depositing the lift on the support, substantially as described.

68. A heel-building machine, having, in combination, a holder for heel-lifts, a support, and means movable between the lift holder and the support for assembling pasted heel-lifts on the latter, said means being constructed and arranged to apply lifts successively to those already assembled and to subject each lift, when applied, to a substantial pressure against the preceding lifts, substantially as described.

69. A heel-building machine, having, in combination, a magazine for sustaining a stack of lifts; a support for a partly formed heel pile; means for pasting said lifts prior to their delivery to the support; and means for obtaining lifts from the magazine and movable for adding successive pasted lifts to the pile on said support and simultaneously subjecting the pile to momentary compression, substantially as described.

70. Blank handling mechanism having, in combination, means for holding a stack of blanks, an intermittently operating device for pressing against and engaging the endmost blank preparatory to withdrawing it from the stack, and a member acting periodically during each blank withdrawing operation to engage and clamp the edges of a portion of the blanks and support the endmost blank against the pressure of said device, substantially as described.

71. A heel machine, having, in combination, a magazine for supporting a stack of heel-lifts, means for pressing upon the edges of the lifts near the end of the stack to clamp said lifts against a wall of the magazine and prevent longitudinal movement within the magazine, and means for adjusting said means to accommodate different sizes of lifts, substantially as described.

72. A heel-building machine, having, in combination, means for supplying lifts, a picker for engaging a lift by its face, pasting means, a support for the lift, operating means for said picker to transfer the lift first to said pasting means and apply paste to the face of the lift, and then to a position to be received by said support, and means to release the lift from the picker when in said last named position, substantially as described.

73. A heel-building machine, having, in combination, a series of magazines in a line containing material for the lifts of a heel, a traveling lift support movable in a predetermined path relative to said line of magazines, a picker adjacent each magazine, arranged to travel from the magazine to the path of movement of the support and adapted to engage the lifts by their faces, means to deliver the lift material in said magazines in position to be engaged by the pickers for transferral to the path of movement of the support, means to release the lifts from the pickers when in said last named position, and means to apply paste to the lifts while held by the pickers, substantially as described.

74. An automatic blank handling mechanism, having in combination, means for seizing blanks successively from a source of supply, said means comprising a member with a plurality of claws in its blank engaging face pointing outwardly and adapted to enter the material of the blank obliquely in divergent directions to engage the blank and support it, means for yieldingly projecting said devices into the blank, and means for actuating said means to transfer the blank from one position to another, substantially as described.

75. Blank handling mechanism having, in combination, blank impaling means including a picker member having blank engaging claws yieldingly sustained therein, an operating device for said claws, and mechanism for moving said means from one position to another to transfer the engaged blank, substantially as described.

76. Blank handling apparatus comprising means for engaging blanks including a picker body with movably mounted claws operative to penetrate and retain a blank when the picker body is placed against the blank, means for locking the claws in impaling position, means independent of the picker body for automatically operating said locking means, said means being operative also to automatically disengage the claws from the blank, and means for actuating said picker body to transfer the engaged blank from one position to another, substantially as described.

77. In a mechanism for transferring and depositing blanks in the process of handling, a blank handling tool, comprising a picker body having movable impaling claws, a claw actuating member carried by said body operable to advance the claws into impaling position, means for actuating said blank handling tool to transfer the impaled blank to a depositing station, means for automatically actuating said member to withdraw the claws to disengaging position after the blank has been deposited, and means for locking said member and claws in the engaging position during the transfer of the impaled blank from one station to another, said means being operative to unlock said member when the blank is deposited, substantially as described.

78. Blank handling mechanism, having, in combination, a transferring device for sustaining and conveying a blank from one position to another, mechanism for repeatedly actuating the transferring device, operating means for said mechanism including a shaft, means for driving the shaft, and means independent of said device, for controlling the continued engagement of the driving means with the shaft, the operation of which is determined by the periodic engagement therewith of a blank in position on the transferring device, substantially as described.

79. Blank handling mechanism, having, in combination, a rotary transferring device for continuously sustaining a blank while conveying it from a receiving position to a delivering position, means for operating said device to move it to and from its respective positions, actuating mechanism for said operating means including a shaft and means for driving the shaft, and means the operation of which is determined only upon the arrival of said device in its delivering position for disengaging the driving means from the shaft in the event of the absence of a blank on said device, substantially as described.

80. Blank handling mechanism, having, in combination, a device for transferring blanks; means for imparting to said device its transferring movement; an operating mechanism for said means including a shaft and a clutch; and a clutch controller including a continuously oscillating arm, a stop arm normally held in inoperative position, and means engageable by the transferring device to cause the oscillating arm to move the stop arm into operative position and disengage the clutch in the event of the absence of a blank on the transferring device, substantially as described.

81. Blank handling mechanism, having, in combination, a device for transferring blanks; means for actuating said device; mechanism for operating said means including a shaft and a clutch; a clutch stop arm; an arm adapted to operate the stop arm to render the clutch inoperative; a device movable to operatively connect said arms constructed and arranged for movement, by a blank on the transferring device, to inoperative position with relation to said arms, and adapted to engage and be shifted by said transferring device to connect the arms, in the event of the absence of a blank, substantially as described.

82. Blank handling mechanism, having, in combination, a holder adapted to contain a stack of blanks, an intermittently operating device for removing said blanks from one end of the holder, means adapted to be positioned over the end of the stack for closing said end of the holder and prevent egress of the blanks in the periods between the operations of said blank removing device, and means for moving said closing means to a position outside the peripheries of the blanks in the stack while said device is operating, substantially as described.

83. Blank handling mechanism, having, in combination, a holder adapted to retain a stack of blanks, means for advancing the stack toward one end of the holder, a pair of abutments for preventing the blanks from being forced out of the holder, and intermittently acting mechanism for transversely removing said abutments simultaneously to permit blanks to be removed from said end, substantially as described.

84. A heel building machine, having, in combination, supporting means formed to receive a row of lifts; means for supplying successive series of lifts to separate stations on said supporting means, and means reciprocating between adjacent pairs of stations for simultaneously advancing all the lifts of the row in intermittent steps from one station to the next in the period between said lift supplying operations, substantially as described.

85. A heel building machine, having, in combination, supporting means for sustaining a row of partially formed heel-piles; a feed bar provided with a series of feed fingers, one for each heel-pile; means for imparting to said fingers a four-motion movement to place them in position to advance the heel-piles, move longitudinally of the row and then withdraw to their initial position thereby causing said piles simultaneously to advance intermittently; and means for adding a heel lift to each pile in each of its positions of rest, substantially as described.

86. A heel making machine, having, in combination, means for intermittently feeding a plurality of partially built heels, and rotary means acting during the periods of rest of the feeding means for applying and securing additional lifts to the several heels, substantially as described.

87. A heel making machine, having, in combination, a movable endless conveyer carrying supports upon which partially built heels are severally adapted to rest, and means for applying and securing lifts to the free surface of each heel when it reaches a predetermined point in its travel, substantially as described.

88. A heel making machine, having, in combination, means for supporting a plurality of partially formed heels and for intermittently moving them through successive lift receiving positions, and mechanism acting during the periods of rest of said means for transversely moving additional lifts into position and securing them on the several heels, substantially as described.

89. A heel building machine, having, in combination, a lift support, means for repeatedly depositing series of lifts in a row on said support spaced apart at separate stations, means for applying paste to each series of lifts, and means for advancing all the deposited lifts intermittently through succeeding stations in the row in the periods between the lift depositing operations, whereby as the series of lifts are advanced additional lifts are simultaneously collected at each forward step, substantially as described.

90. A heel building machine, having, in combination, means to deposit a series of lifts in a row spaced apart at separate stations, a support on which said lifts are received, means for intermittently advancing said support to move the deposited lifts simultaneously through succeeding stations in the row while maintaining their spaced relation, mechanism timed to operate said lift depositing means at each period of rest of said support, whereby each successive series of lifts is collected on those previously deposited, and means for securing together the lifts thus formed into heel piles, substantially as described.

91. A heel machine, having, in combination, a conveyer for advancing heels step by step, means for adding lifts to the heels in the periods between said steps, a heel nailing mechanism including a nailing plunger to which the heels are delivered while on the conveyer, and means for rigidly supporting the conveyer against the driving pressure of the nailing plunger, substantially as described.

92. A heel machine, having, in combination, a conveyer for advancing a series of heels, means for adding lifts to the successive heels upon the conveyer, a heel nailing mechanism for securing the lifts of said heels together while on the conveyer, said mechanism comprising a heel nailing plunger at one side of the heel and a heel supporting plunger at the opposite side of the heel, and means for advancing said supporting plunger to lend rigidity to the conveyer when the nailing plunger is operated, substantially as described.

93. Blank handling mechanism, having, in combination, means for holding a stack of blanks, means for advancing the blanks toward one end of the holder, an intermittently operating device adapted to remove the endmost blank from the stack, and an intermittently operating member movable transversely of the stack against the edges of the blanks to alternately clamp and release a portion of the blanks in the stack to respectively hold the blanks against longitudinal movement and permit them to be advanced, substantially as described.

94. A heel machine, having, in combination, a magazine having side walls for holding lifts in stack formation, a section of one of said walls being movable inward and outward relative to its opposite wall, and means operating periodically to move said section inward against the edges of a portion of the lifts whereby to clamp said lifts against movement within the magazine, substantially as described.

ERASTUS E. WINKLEY.

Witnesses:
 WARREN G. OGDEN,
 RUTH A. SIMONDS.